United States Patent
Behrens

(10) Patent No.: US 9,643,524 B2
(45) Date of Patent: May 9, 2017

(54) BACKREST FOR A REAR SEAT OF A MOTOR VEHICLE

(75) Inventor: Meinhard Behrens, Obernkirchen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 2373 days.

(21) Appl. No.: 12/439,129

(22) PCT Filed: Jul. 30, 2007

(86) PCT No.: PCT/EP2007/006716
§ 371 (c)(1), (2), (4) Date: Jul. 15, 2009

(87) PCT Pub. No.: WO2008/028543
PCT Pub. Date: Mar. 13, 2008

(65) Prior Publication Data
US 2011/0127823 A1 Jun. 2, 2011

(30) Foreign Application Priority Data

Sep. 5, 2006 (DE) .................. 10 2006 041 524
Sep. 5, 2006 (DE) .................. 10 2006 041 528

(51) Int. Cl.
*B60N 2/68* (2006.01)
*B60N 2/70* (2006.01)

(52) U.S. Cl.
CPC ............. *B60N 2/686* (2013.01); *Y10T 29/48* (2015.01); *Y10T 29/49622* (2015.01)

(58) Field of Classification Search
CPC ............................ B60N 2/686; B60N 2/7029
USPC ................... 297/452.18, 452.38, 452.55
See application file for complete search history.

(56) References Cited

U.S. PATENT DOCUMENTS

| | | | | |
|---|---|---|---|---|
| 4,493,505 A | * | 1/1985 | Yamawaki | B60N 2/3013 296/63 |
| 4,509,796 A | * | 4/1985 | Takagi | A47C 7/16 297/452.55 |
| 5,609,395 A | * | 3/1997 | Burch | A47C 7/42 297/335 |
| 6,260,924 B1 | | 7/2001 | Jones et al. | |
| 8,267,479 B2 | * | 9/2012 | Yamada | B60N 2/22 297/452.18 |

(Continued)

FOREIGN PATENT DOCUMENTS

| | | |
|---|---|---|
| DE | 3046427 A1 | 7/1982 |
| DE | G 8600815 U1 | 2/1986 |

(Continued)

OTHER PUBLICATIONS

PCT International Search Report for PCT/EP2007/006716 completed by the EP Searching Authority on Oct. 1, 2007.

(Continued)

*Primary Examiner* — Timothy J Brindley
(74) *Attorney, Agent, or Firm* — Barnes & Thornburg LLP

(57) ABSTRACT

The invention relates to a backrest (3) for a rear seat or a rear bench (1) of a motor vehicle, in particular a backrest (3) produced in accordance with a method according to one of the preceding claims, wherein the backrest (3) has upholstery (4) and a back plate (5, 5B) which is arranged behind the upholstery (4) and extends essentially over the entire backrest (3), wherein at least two thirds of the back plate (5, 5B) are composed of a rolled metal sheet.

2 Claims, 20 Drawing Sheets

(56) References Cited

U.S. PATENT DOCUMENTS

| | | | |
|---|---|---|---|
| 2003/0160482 A1* | 8/2003 | Yanai | B60N 2/3013 297/216.13 |
| 2004/0041456 A1* | 3/2004 | Kinzer | B60N 2/686 297/452.18 |
| 2004/0155511 A1* | 8/2004 | Garnweidner | B60N 2/686 297/452.18 |
| 2006/0163921 A1* | 7/2006 | Macliver | B60N 2/2806 297/248 |
| 2008/0018161 A1* | 1/2008 | Evans | B60N 2/3013 297/440.14 |
| 2008/0084105 A1* | 4/2008 | Behrens | B60N 2/5816 297/452.55 |
| 2008/0191539 A1* | 8/2008 | Teufel | B60N 2/2245 297/452.18 |
| 2009/0289491 A1* | 11/2009 | Nakagaki | B60N 2/686 297/452.2 |
| 2010/0283309 A1* | 11/2010 | Funk | B29C 44/18 297/452.48 |
| 2011/0140480 A1* | 6/2011 | Nakamura | B60N 2/3013 296/187.05 |
| 2011/0163587 A1* | 7/2011 | Kmeid | B60N 2/68 297/452.2 |
| 2011/0278900 A1* | 11/2011 | Zekavica | B60N 2/68 297/452.2 |
| 2012/0181839 A1* | 7/2012 | Michalak | B60N 2/686 297/452.1 |
| 2012/0187738 A1* | 7/2012 | Gross | B21D 26/14 297/452.1 |
| 2015/0102650 A1* | 4/2015 | Hosbach | B60N 2/68 297/452.18 |
| 2015/0336489 A1* | 11/2015 | Kijima | B60N 2/686 297/188.01 |

FOREIGN PATENT DOCUMENTS

| | | |
|---|---|---|
| DE | 44 02 864 | 8/1995 |
| DE | 29514752 U1 | 11/1995 |
| DE | 19718067 A1 | 11/1998 |
| DE | 20204180 U1 | 7/2002 |
| DE | 10126014 C1 | 1/2003 |
| DE | 10142981 A1 | 3/2003 |
| DE | 10153156 A1 | 5/2003 |
| DE | 10240042 A1 | 3/2004 |
| DE | 202004019560 A1 | 3/2005 |
| DE | 20 2005 007 198 | 10/2005 |
| DE | 20 2006 001868 | 4/2006 |
| DE | 102005005485 A1 | 8/2006 |
| DE | 10 2006 041 524.8 | 5/2009 |
| EP | 0875416 A2 | 4/1998 |
| WO | WO 01/89875 A | 11/2001 |

OTHER PUBLICATIONS

Response filed Nov. 15, 2010 in connection with an Office Action received in German Priority Application No. 102006041524.8.
D13 Sicherheit and Sitzentwicklung.
DE 14 Kaltprofile auf Erfolgskurs, Wendel vom Halbzeug zum Bauteil, Von Edmund Schruff.

* cited by examiner

BACKREST FOR A REAR SEAT OF A MOTOR VEHICLE

CROSS-REFERENCE TO RELATED APPLICATIONS

This application is a U.S. national counterpart application of international application serial No. PCT/EP2007/006716 filed Jul. 30, 2007, which claims priority to German Patent Application No. 102006041528.0 filed Sep. 5, 2006 and to German Patent Application No. 102006041524.8 filed Sep. 5, 2006.

FIELD OF THE INVENTION

The invention refers to a backrest for a rear seat and/or a rear bench-type seat of a motor vehicle. Furthermore, the invention refers to a rear seat or a rear bench-type seat including such aforementioned backrest. Also, the invention refers to a method for manufacturing such aforementioned backrest.

BACKGROUND INFORMATION

U.S. Pat. No. 6,260,924 B1 comprises a modular rear seat system for a vehicle which comprises a type A seat back frame having a fastening facility for a central shoulder safety belt, and a type B seat back frame of small width. The left ends of the seat back frames are essentially similar regarding their sizes and shapes, and the right ends of the seat back frames are essentially similar regarding their sizes and shapes, as well. The symmetry regarding the ends makes it possible that the modular rear seat system forms a "40/40 Configuration" with two type B seat back frames for smaller vehicles and a "40/60 Configuration" with one type A and one type B seat back frame, each, for medium size vehicles and a "60/60 Configuration" with two type A seat back frames for larger vehicles. Moreover, the dual nature of the modular rear seat system enables the formation of a "40/60 Configuration" in left hand steered vehicles of one vehicle (production) line and of a "60/40 Configuration" in right hand steered vehicles.

DE 10 2005 005 485 discloses a rear-section rest frame for a rear-section rest part of a vehicle seat including at least one base plate, a left and a right vertically extending lateral hat-shaped section and an upper and a lower, transversely extending hat-shaped section, wherein the hat-shaped sections are welded onto the front side of the base plate, wherein the rear-section rest frame has cushion channels for attaching a cushion and/or a cover along its lateral edges and its upper and lower edges, wherein the hat-shaped sections are formed rectilinearly, wherein the lateral hat-shaped sections are welded to the hat-shaped sections extending in the transverse direction, and wherein lateral cushion channels are formed on the lateral hat-shaped sections.

DE 20 2004 019 560 U1 discloses a rest frame for a vehicle seat having one or several hinged rest frame parts, wherein each rest frame part comprises a lower hat-shaped section extending in the transverse direction, an upper hat-shaped section extending in the transverse direction, several vertical bars each being welded to the hat-shaped sections at their ends, a rear metal plate which is welded to the rear side of the hat-shaped sections and/or the vertical bars, and two outer joints, each of which has a bearing block to be attached to the vehicle chassis and a joint bolt received in the bearing block and in the lower hat-shaped section, wherein the vertical bars are welded to the hat-shaped sections free of positive-fit by means of their ends.

DE 101 42 981 A1 discloses a (back)rest-cushion-carrier for a motor vehicle rear bench-type seat having a base metal plate and at least one reinforcing frame at least partially extending circumferentially and being fixedly connected to the base plate.

DE 202 04 180 U1 discloses a structural carrier for a motor vehicle seat having bars for reinforcement, wherein the bars are connected with a base metal plate forming box-shaped sections.

EP 0 875 4 16 A2 discloses a tiltable backrest for a rear seat of a vehicle, wherein the bearing structure of the backrest is essentially formed by a single extruded profile, the direction of manufacture of which extends in the direction of the width extension of the rear seat, and wherein a lateral closing element is provided in a lateral region of the extruded profile.

DE 101 26 014 C1 discloses a hinged backrest for a rear seat of a motor vehicle, wherein the backrest, when viewed in the direction of its width, is formed essentially continuously and is manufactured as a hollow extrusion-pressed profile with at least one profile chamber, and wherein the direction of extrusion of the extrusion-pressed profile extends in the direction of the height of the backrest.

DE 30 46 427 A1 discloses a backrest for a vehicle seat having a lateral part.

DE 101 53 156 A1 discloses a cushion carrier for a motor vehicle seat, said carrier having a single metal base plate for each independently movable part of the cushion carrier, in which base metal plate beads are formed which cohere with each other as an at least partially circumferential channel, wherein cohering beads have differing depths.

WO 01/89875 A1 discloses a bench-type seat for a vehicle having a tiltable backrest being subdivided into two portions of which at least one is formed by a plate on which a profile is arranged, said profile being composed of modules which, together, form a frame.

It is an object of the invention to reduce the costs for manufacturing a backrest for a rear seat or a rear bench-type seat of a motor vehicle, or those for the manufacture of a rear seat or a rear bench-type seat of a motor vehicle.

SUMMARY OF THE INVENTION

The aforementioned object is achieved by a backrest for a rear seat or a rear bench-type seat of a motor vehicle wherein the backrest comprises a cushion and a back metal plate arranged behind the cushion, which back metal plate extends essentially over the whole backrest, wherein the back metal plate comprises a base plate and a lateral part which is fixedly connected with, in particular welded to the base plate at least on one side (directly or indirectly), wherein one side of the lateral part, which one side is facing away from the side of the lateral part which is attached to the base plate, is adapted to the contour of a wheel housing and/or a chassis of the motor vehicle.

Herein, it is particularly provided that the base plate and the lateral part are arranged essentially in the same plane or in parallel planes, in particular at a rather small distance with respect to each other. In this context "a rather small distance" is particularly to mean a distance in the order of the thickness of the metal plate of the lateral part or of the base plate. A base plate or a lateral part is regarded to be arranged in the plane in which the essential portion of its surface extends.

According to the gist of the invention, a back metal plate will extend essentially over the whole backrest particularly in cases in which it extends in two orthogonal directions essentially over the whole backrest. According to the gist of the invention, a back metal plate will extend essentially over the whole backrest particularly when it extends essentially over the whole backrest viewed in the transverse direction of the motor vehicle as well as in the vertical direction thereof. A back metal plate will extend, according to the gist of the invention, essentially over the whole backrest particularly when it extends over essentially the whole backrest in its longitudinal direction as well as in the vertical direction.

In an embodiment of the invention the width of the lateral part will vary by at least 20% when viewed in the transverse direction of the motor vehicle. In a further embodiment of the invention the lateral part is designed asymmetrically in three directions which are orthogonal with respect to each other. According to the gist of the invention, a metal plate or lateral part will be regarded designed to be asymmetrical in three directions lying orthogonal with respect to each other particularly if there is no direction in which the plate, or the lateral part is symmetrical.

In a further embodiment of the invention, a cushion channel for attaching the cushion and/or a cover is formed in one of the edges of the lateral part, wherein, according to a further embodiment of the invention, the lateral part is bordered by the cushion channel on at least two of its sides or on three sides.

In a further expedient embodiment of the invention a cushion channel for attaching the cushion and/or a cover is formed in one edge of the base plate, or one cushion channel, each, for attaching the cushion and/or the cover is formed in two opposing edges of the base plate. It is also possible that an essentially vertically extending cushion channel is formed in the base plate.

In a further embodiment of the invention the base plate is a rolled metal plate. A rolled metal plate, in the sense of the invention, in particular is a metal plate manufactured by rolling. Herein, an essential or a by far major portion of the (final) contour of the metal plate is not manufactured by pressing or stamping, but by rolling.

In a further expedient embodiment of the invention the lateral part is a pressed metal plate. A pressed metal plate, in the sense of the invention, is in particular a metal plate manufactured by pressing or stamping. Herein, an essential or a by far major portion of the contour of the metal plate is manufactured by pressing or stamping.

In a further embodiment of the invention the lateral section is composed of a material differing from the material of the base plate, wherein it is particularly provided that the base plate has a lower weight per area unit than the lateral part. In a further expedient embodiment of the invention the lateral part is composed of a material having a lower tensile strength than the material of the base plate. In further embodiment of the invention the thickness of the metal plate of the lateral part is larger than the thickness of the metal plate of the base plate. In a further embodiment of the invention the size of the area of the base plate is at least double as large as the size of the area of the lateral part.

In a further embodiment of the invention the back metal plate comprises a profile carrier in particular designed as a hat-shaped section on a side of the base plate facing away from the lateral part. Herein, and in a further expedient embodiment of the invention, the profile carrier comprises a cushion channel for attaching the cushion and/or a cover.

In a further expedient embodiment of the invention a profile extending in the transverse direction of the motor vehicle, or a bead extending in the transverse direction of the motor vehicle, is formed in the base plate.

In a further embodiment of the invention the base plate is composed of steel having a tensile strength of at least 800 N/mm$^2$.

The aforementioned object is moreover achieved by a backrest for a rear seat or a rear bench-type seat of a motor vehicle—said backrest in particular including one or several of the aforementioned features—, wherein the backrest comprises a cushion and a back metal plate arranged behind the cushion and extending essentially over the whole backrest, wherein the back metal plate comprises a base plate and a lateral part connected with, in particular welded to the base plate, and wherein the width of the lateral part varies by at least 20%, when viewed in the transverse direction of the motor vehicle.

Herein, it is particularly provided that the base plate and the lateral part are arranged essentially in the same plane or in parallel planes, in particular at a very small distance from each other. In this sense, a very small distance is particularly regarded to be a distance in the order of the thickness of the metal plate of the lateral part or of the base plate. Herein, a base plate or a lateral part is regarded to be arranged in the plane in which the essential portion of its surface is extending.

According to the gist of the invention, a back metal plate will, in particular, extend essentially over the whole backrest if it extends essentially over the whole backrest in two orthogonal directions. According to the gist of the invention, a back metal plate will, in particular, extend over the whole backrest if it extends essentially over the whole backrest in the transverse direction of the motor vehicle as well as in the vertical direction. A back metal plate, in the sense of the invention, will, in particular, extend essentially over the whole backrest if it extends over essentially the whole backrest in the longitudinal direction as well as in the vertical direction thereof.

In a further embodiment of the invention the lateral part is designed to be unsymmetrical in three directions which are orthogonal with respect to each other. In the sense of the invention, a metal plate or a lateral part is in particular regarded to be formed asymmetrically in three directions orthogonal with regard to each other if there is no direction in which the metal plate or the lateral part is symmetrical.

In a further embodiment of the invention, a cushion channel for attaching the cushion and/or a cover is formed in one of the edges of the lateral part, wherein, according to a further embodiment of the invention, the lateral part is bordered by the cushion channel on at least two of its sides or on three sides.

In a further expedient embodiment of the invention a cushion channel for attaching the cushion and/or a cover is formed in one edge of the base plate, or one cushion channel, each, for attaching the cushion and/or the cover is formed in two opposing edges of the base plate. It is also possible that an essentially vertically extending cushion channel is formed in the base plate.

In a further embodiment of the invention the base plate is a rolled metal plate. A rolled metal plate, in the sense of the invention, is, in particular, a metal plate manufactured by rolling. Herein, an essential or by far major portion of the (final) contour of the metal plate is not generated by pressing or stamping, but by rolling.

In a further expedient embodiment of the invention the lateral part is a pressed metal plate. A pressed metal plate, in the sense of the invention, is, in particular, a metal plate manufactured by pressing or stamping. Herein, an essential or by far major portion of the contour of the metal plate is generated by pressing or stamping.

In a further embodiment of the invention the lateral part is composed of a material differing from that of the base plate, wherein, in particular, it is provided that the base plate has a lower weight per area unit than the lateral part. In a further expedient embodiment of the invention the lateral part is composed of a material having a lower tensile strength than the material of the base plate. In a further embodiment of the invention the thickness of the metal plate of the lateral part is larger than the thickness of the metal plate of the base plate. In a further embodiment of the invention the size of the area of the base plate is at least double as large as the size of the area of the lateral part.

In a further embodiment of the invention the back metal plate comprises a profile carrier in particular designed as a hat-shaped section on a side of the base plate facing away from the lateral part. In a further expedient embodiment of the invention, the profile carrier, in this context, comprises a cushion channel for attaching the cushion and/or a cover.

In a further expedient embodiment of the invention a profile extending in the transverse direction of the motor vehicle, or a bead extending in the transverse direction of the motor vehicle, is formed in the base plate.

In a further embodiment of the invention the base plate is composed of steel having a tensile strength of at least 800 N/mm².

The aforementioned object is moreover achieved by a backrest for a rear seat or a rear bench-type seat of a motor vehicle, said backrest, in particular, including one or several of the aforementioned features, wherein the backrest comprises a cushion and a back metal plate arranged behind the cushion and extending essentially over the whole backrest, wherein the back metal plate comprises a base plate and a lateral part connected with, in particular welded to the base plate, and wherein the lateral part is designed to be asymmetrical in three directions which are orthogonal with respect to each other. In the sense of the invention, a metal plate or a lateral part will be regarded to be designed asymmetrical in three directions lying orthogonal with respect to each other particularly when there is no direction in which the plate or the lateral part is symmetrical.

Herein, it is, in particular, provided that the base plate and the lateral part are arranged essentially in the same plane or in parallel planes, in particular at a very small distance from each other. In this sense, a very small distance is, in particular, regarded to be a distance in the order of the thickness of the metal plate of the lateral part or of the base plate. Herein, a base plate or a lateral part is regarded to be arranged in the plane in which the essential portion of its surface is extending.

In the sense of the invention, a back metal plate will extend essentially over the whole backrest particularly in cases when it extends essentially over the whole backrest in two orthogonal directions. In the sense of the invention, a back metal plate will extend essentially over the whole backrest particularly if it extends essentially over the whole backrest in the transverse direction of the motor vehicle as well as in the vertical direction. A back metal plate, in the sense of the invention, will extend essentially over the whole backrest particularly if it extends over essentially the whole backrest in the longitudinal direction thereof as well as in the vertical direction.

In a further embodiment of the invention, a cushion channel for attaching the cushion and/or a cover is formed in one of the edges of the lateral part, wherein, according to a further embodiment of the invention, the lateral part is bordered by the cushion channel on at least two of its sides or on three sides.

In a further expedient embodiment of the invention a cushion channel for attaching the cushion and/or a cover is moulded 16 into one edge of the base plate, or one cushion channel, each, for attaching the cushion and/or the cover is formed in two opposing edges of the base plate. It is also possible that an essentially vertically extending cushion channel is formed in the base plate.

In a further expedient embodiment of the invention the base plate is a rolled metal plate. A rolled metal plate, in the sense of the invention, is, in particular, a metal plate manufactured by rolling. Herein, an essential or by far major portion of the (final) contour of the metal plate is not generated by pressing or stamping, but by rolling.

In a further expedient embodiment of the invention the lateral part is a pressed metal plate. A pressed metal plate, in the sense of the invention, is, in particular, a metal plate manufactured by pressing or stamping. Herein, an essential or by far major portion of the contour of the metal plate is generated by pressing or stamping.

In a further embodiment of the invention the lateral section is composed of a material differing from that of the base plate, wherein it is, in particular, provided that the base plate has a lower weight per area unit than the lateral part. In a further expedient embodiment of the invention the lateral part is composed of a material having a lower tensile strength than the material of the base plate. In a further embodiment of the invention the thickness of the metal plate of the lateral part is larger than the thickness of the metal plate of the base plate. In a further embodiment of the invention the size of the area of the base plate is at least double as large as the size of the area of the lateral part.

In a further embodiment of the invention the back metal plate comprises a profile carrier in particular designed as a hat-shaped section on a side of the base plate facing away from the lateral part. In a further expedient embodiment of the invention, the profile carrier, in this context, comprises a cushion channel for attaching the cushion and/or a cover.

In a further expedient embodiment of the invention a profile extending in the transverse direction of the motor vehicle, or a bead extending in the transverse direction of the motor vehicle, is formed in the base plate.

In a further embodiment of the invention the base plate is composed of steel having a tensile strength of at least 800 N/mm².

The aforementioned object is, moreover, achieved by a method for manufacturing a backrest for a rear seat or a rear bench-type seat of a motor vehicle, in particular a backrest comprising one or several of the aforementioned features, wherein a base plate is generated, in particular rolled, wherein a lateral part is pressed such that one side of the lateral part is adapted to the contour of a wheel housing and/or a chassis of the motor vehicle such that the width of the lateral part varies by at least 20%, in the transverse direction of the motor vehicle, and/or that the lateral part is designed asymmetrical in three directions which are orthogonal with respect to each other, and wherein the base plate and the lateral part are connected fixedly with each other (directly or indirectly) to form a back metal plate for the backrest, which back metal plate extends essentially over the whole backrest.

In an embodiment of the invention the base plate and the lateral part are welded to each other.

In a further embodiment of the invention, for manufacturing the base plate, a steel strip is rolled, wherein the base plate is cut-off from the rolled steel strip.

In a further embodiment of the invention the steel strip is rolled such that a cushion channel for attaching the cushion and/or a cover is formed in at least one longitudinal edge.

In a further expedient embodiment of the invention the back metal plate is padded.

A rear seat or a rear bench-type seat of a motor vehicle may comprise a divided or divisible backrest. In this case a backrest for a rear seat of a motor vehicle is, in the sense of the invention, in particular a portion of the divided or divisible backrest.

The aforementioned object is moreover achieved by a method for manufacturing a backrest for a rear seat or a rear bench-type seat of a motor vehicle, wherein a steel strip is rolled, wherein a base plate is cut-off from the rolled steel strip, wherein a lateral part is pressed, and wherein the base plate and the lateral part are fixedly connected with each other to form a back metal plate for the backrest, which plate extends essentially over the whole backrest. Herein, the base plate, in particular, comprises at least two thirds of the back metal plate.

In the sense of the invention, a back metal plate will extend essentially over the whole backrest particularly in cases in which it extends essentially over the whole backrest in two orthogonal directions. In the sense of the invention, a back metal plate will extend essentially over the whole backrest particularly when it extends essentially over the whole backrest in the transverse direction of the motor vehicle as well as in the vertical direction. A back metal plate, in the sense of the invention, will, in particular, extend essentially over the whole backrest when it extends over essentially the whole backrest in the longitudinal direction as well as in the vertical direction.

A rear seat or a rear bench-type seat of a motor vehicle may comprise a divided or divisible backrest. In this case, a backrest for a rear seat of a motor vehicle is, in the sense of the invention, in particular a portion of the divided or divisible backrest.

In an embodiment of the invention the back metal plate is padded. In a further embodiment of the invention the steel strip is rolled such that a cushion channel for attaching a padding and/or a cover is formed in at least one longitudinal edge. In a further expedient embodiment of the invention the steel strip is rolled such that one cushion channel, each, for attaching a padding and/or a cover is formed in its longitudinal edges. In a further embodiment of the invention the steel strip is rolled such that at least one profile or bead is formed in its longitudinal direction.

The aforementioned object is moreover achieved by a method for manufacturing a backrest for a rear seat or a rear bench-type seat of a motor vehicle, wherein a steel strip is rolled such that a cushion channel for attaching a cushion/padding and/or a cover is formed in at least one longitudinal edge, wherein a base plate is cut-off from the rolled steel strip, and wherein the base plate is integrated in the backrest as a back metal plate or as a portion of a back metal plate, which back metal plate will extend essentially over the whole backrest. Herein, the base plate comprises, in particular, at least two thirds of the back metal plate.

In the sense of the invention, a back metal plate will, in particular, extend essentially over the whole backrest in cases in which it extends in two orthogonal directions essentially over the whole backrest. In the sense of the invention, a back metal plate will extend essentially over the whole backrest particularly when it extends essentially over the whole backrest in the transverse direction of the motor vehicle as well as in the vertical direction. A back metal plate will extend, in the sense of the invention, essentially over the whole backrest particularly when it extends over essentially the whole backrest in its longitudinal direction as well as in the vertical direction.

A rear seat or a rear bench-type seat of a motor vehicle may comprise a divided or divisible backrest. In this case, a backrest for a rear seat of a motor vehicle is, in the sense of the invention, in particular a portion of the divided or divisible backrest.

In an embodiment of the invention the back metal plate is padded(-up). In a further expedient embodiment of the invention the steel strip is rolled such that one cushion channel, each, for attaching the cushion/padding and/or the cover is formed in its longitudinal edges. In a furthermore expedient embodiment of the invention the steel strip is rolled such that at least one profile or bead is formed in its longitudinal direction.

The aforementioned object is moreover solved by a method for manufacturing a backrest for a rear seat or a rear bench-type seat of a motor vehicle, wherein a steel strip is rolled, wherein a base plate is cut-off from the rolled steel strip, and wherein the base plate is padded with a cushion/padding.

A rear seat or a rear bench-type seat of a motor vehicle may comprise a divided or divisible backrest. In this case, a backrest for a rear seat of a motor vehicle is, in the sense of the invention, in particular a portion of the divided or divisible backrest.

Herein, the base plate according to an embodiment extends over at least two thirds of the backrest.

In an embodiment of the invention the steel strip is rolled such that in at least one longitudinal edge a cushion channel for attaching the cushion and/or a cover is formed. In a further expedient embodiment of the invention the steel strip is rolled such that one cushion channel, each, for attaching the cushion/padding and/or the cover is formed in its longitudinal edges. In a further embodiment of the invention the steel strip is rolled such that at least one profile or bead is formed in its longitudinal direction.

The aforementioned object is moreover achieved by a backrest for a rear seat or a rear bench-type seat of a motor vehicle, in particular a backrest manufactured according to an aforementioned method, wherein the backrest comprises a cushion/padding and a back metal plate arranged behind the cushion and extending essentially over the whole backrest, and wherein at least two thirds of the back metal plate are composed of a rolled metal plate. A rolled metal plate, in the sense of the invention, is, in particular, a metal plate manufactured by rolling. Herein, an essential or by far major portion of the (final) contour of the metal plate is not manufactured by pressing or stamping, but by rolling.

In the sense of the invention, a back metal plate will extend essentially over the whole backrest particularly in cases when it extends in two orthogonal directions essentially over the whole backrest. In the sense of the invention, a back metal plate will extend essentially over the whole backrest particularly when it extends essentially over the whole backrest in the transverse direction of the motor vehicle as well as in the vertical direction. In the sense of the invention, a back metal plate will extend essentially over the whole backrest particularly when it extends essentially over the whole backrest in its longitudinal direction as well as in the vertical direction.

A rear seat or a rear bench-type seat of a motor vehicle may comprise a divided or divisible backrest. In this case, a backrest or a rear seat of a motor vehicle is, in the sense of the invention, in particular a portion of the divided or divisible backrest.

In an embodiment of the invention a cushion channel for attaching the cushion/padding and/or a cover is formed in a rolled edge of the back metal plate. In a further expedient embodiment of the invention the back metal plate has a rolled base plate comprising at least two thirds of the back metal plate, which base plate is fixedly connected with a pressed lateral part. A pressed metal plate, in the sense of the invention, is, in particular, a metal plate manufactured by pressing or stamping. Herein, an essential or by far major portion of the contour of the metal plate is manufactured by pressing or stamping. In a further embodiment of the invention a cushion channel for attaching the cushion and/or the cover is formed in an edge of the base plate. There may be provided a cushion channel of the type which extends essentially vertically. Herein, essentially vertically means a direction which is essentially vertical when the backrest is in an upright position.

In a further embodiment of the invention a cushion channel for attaching the cushion and/or the cover is formed in an edge of the lateral part, wherein the lateral part, in a further embodiment of the invention, is bordered by the cushion channel on at least two sides and/or on three sides.

In a further expedient embodiment of the invention the lateral part is composed of a material having a lower tensile strength than the material of the base plate. In a furthermore embodiment of the invention the base plate is composed of steel having a tensile strength of at least 800 N/mm$^2$. In a furthermore expedient embodiment of the invention the thickness of the metal plate of the lateral part is larger than the thickness of the metal plate of the base plate. In a furthermore embodiment of the invention the size of the area of the base plate is at least double as large as the size of the area of the lateral part.

In a further expedient embodiment of the invention the back metal plate comprises, on one side, a profile carrier which is particularly designed as a hat-shaped section, wherein the profile carrier according to an embodiment comprises a cushion channel for attaching the cushion/padding and/or the cover. This cushion channel, in an expedient embodiment of the invention, extends essentially vertically.

In a furthermore embodiment of the invention a profile extending in the transverse direction of the motor vehicle or a bead extending in the transverse direction of the motor vehicle is formed in the back metal plate.

The aforementioned object is furthermore achieved by a rear seat or a rear bench-type seat having a backrest as mentioned before.

A back metal plate, in the sense of the invention, is, in particular, a metal plate which helps maintaining a so-called space of survival (cf. DE 100 22 984 A1).

A motor vehicle, in the sense of the invention, is in particular a land vehicle to be used individually in road traffic. Motor vehicles, in the sense of the invention, are, in particular, not restricted to land vehicles having combustion engines.

Further advantages and details may be taken from the following description of specific examples of embodiments.

DETAILED DESCRIPTION

Figure 1:
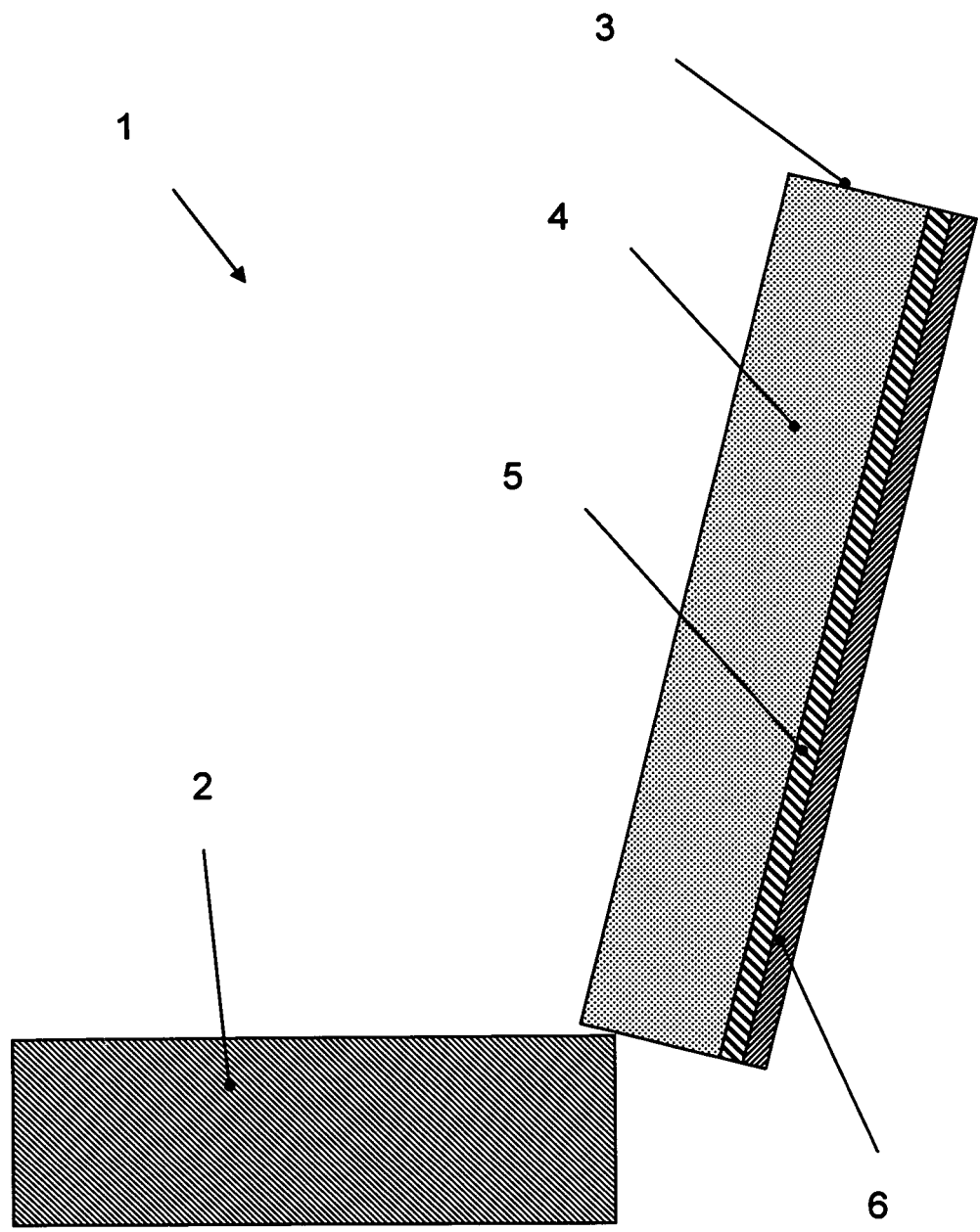
FIG. 1 shows, by way of a simplified principle representation, a cross-section of an example of an embodiment of a rear seat or a rear bench-type seat of a motor vehicle.

FIG. 1 shows an exemplified embodiment of a cross-section through an example of embodiment of a rear seat or a rear bench-type seat 1 of a motor vehicle by way of a simplified principle representation. The rear seat or the rear bench-type seat 1 comprises a sitting portion 2 and a backrest 3. The backrest 3 comprises a cushion or padding 4 and a back metal plate 5 arranged behind the cushion 4. A lining 6, such as for example a cover, may be provided behind the back metal plate 5. The backrest 3 may comprise a (non-shown) frame connected to the back metal plate 5. Examples of such frames are e.g. disclosed in DE 10 2005 005 485, DE 20 2004 019 560 U1 and DE 101 42 981 A1. The rear seat or the rear bench-type seat 1 moreover comprises a (non-shown) head-rest. The elements of FIG. 1 have been drawn considering simplicity and clearness and are thus not necessarily shown to scale. Thus, for example the scale of some of the elements of FIG. 1 has been exaggerated with regard to other elements in order to improve comprehension of the example of embodiment.

Figure 2:
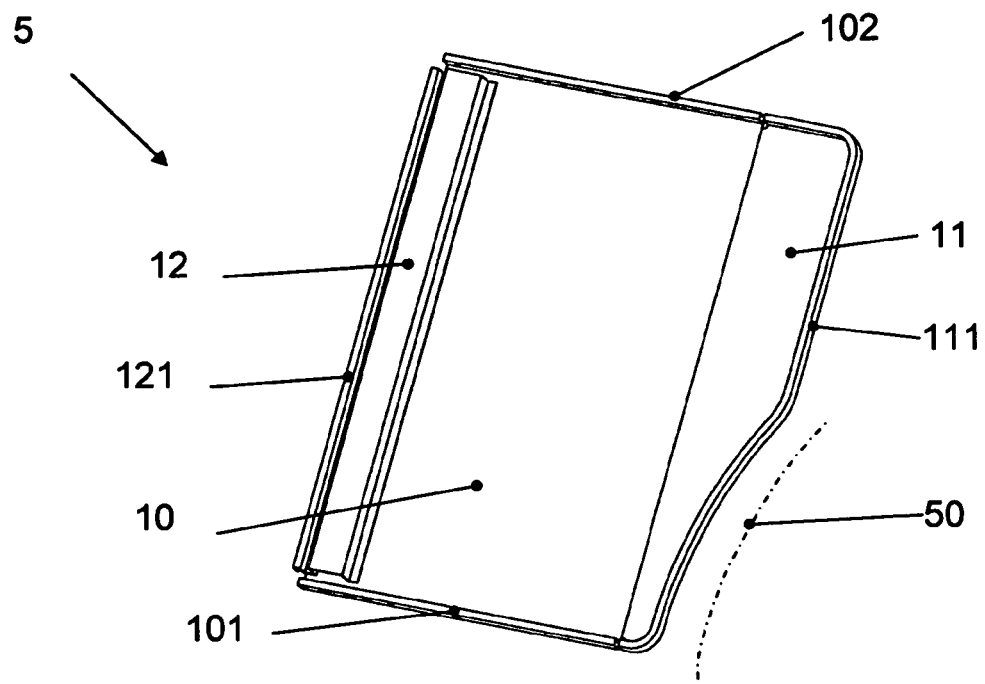
FIG. 2 shows, by way of a perspective representation, an example of embodiment of a back metal plate for the backrest of a rear seat or a rear bench-type seat according to FIG. 1.
Figure 3:
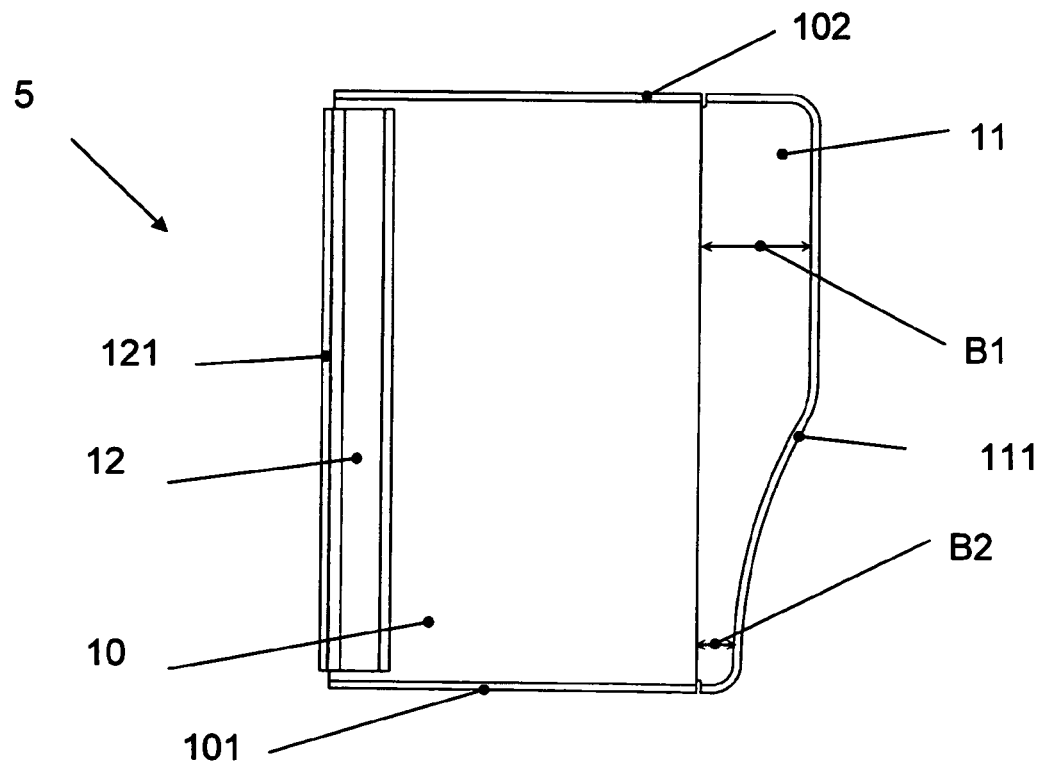
FIG. 3 shows a top view of the back metal plate according to FIG. 2.
Figure 4:
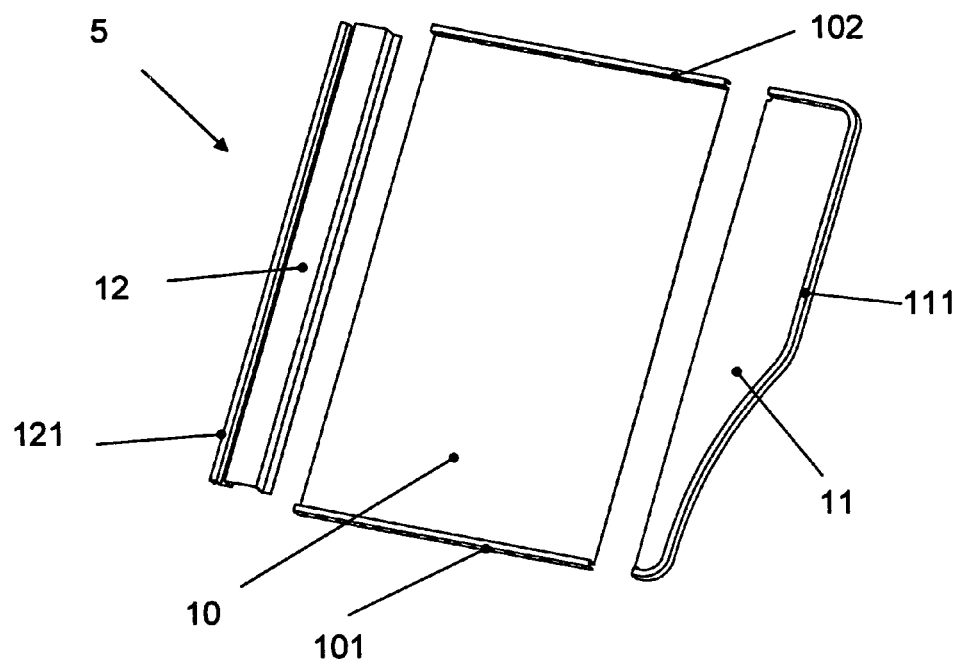
FIG. 4 shows an exploded view of the back metal plate according to FIG. 2.
Figure 5:
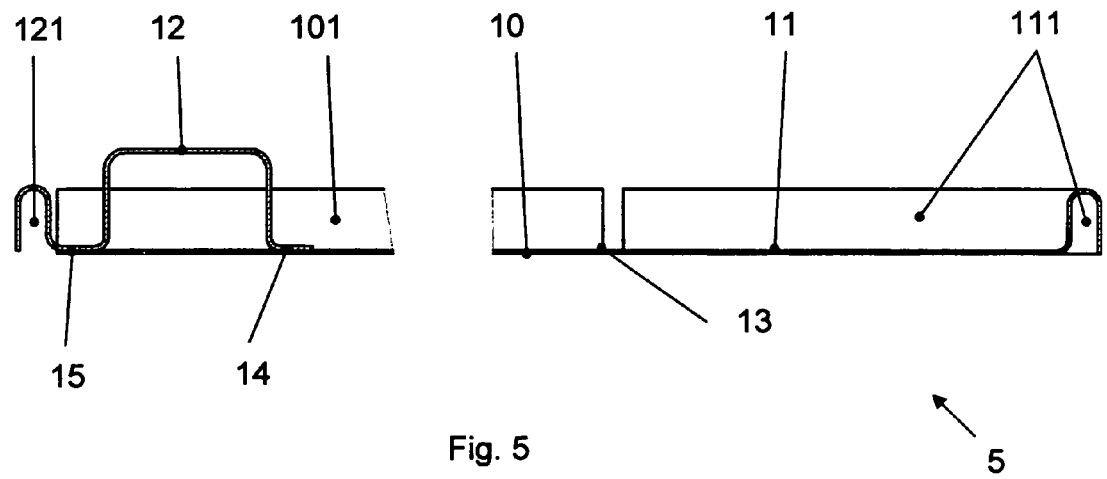
FIG. 5 shows a cross-sectional representation of the back metal plate according to FIG. 2.

FIG. 2 shows an example of embodiment of the back metal plate 5 by way of a perspective representation, FIG. 3 shows the back metal plate 5 by way of a top view, FIG. 4 shows the back metal plate 5 by way of an exploded representation, and FIG. 5 shows the back metal plate 5 by way of a cross-sectional representation. The back metal plate 5 comprises a rolled base plate 10 and a pressed lateral part 11 which has been welded to the base plate 10 by butt joint in the area designated by reference numeral 13. The side of the lateral part 11 facing away from the side of the lateral part 11 connected to the base plate 10 is adapted to the contour 50 of a wheel housing and/or a chassis of the motor vehicle. Herein, the lateral part 11 is according to an embodiment designed such that its width varies by at least 20% when seen in the transverse direction of the motor vehicle. In the shown example of embodiment the width of the lateral part 11 varies by 60% when seen in the transverse direction of the motor vehicle, i.e. the smallest width B2 of the lateral part 11 is 40% of the largest width B1 of the lateral part 11. The surface of the base plate 10 is at least double as much as the surface of the lateral part 11.

A cushion channel 111 for attaching the cushion 4 and/or a cover has been formed in a portion of the edge of the lateral part 11, which channel encloses the lateral part 11 along three sides. Also, one cushion channel 102 or 101, each, for attaching the cushion 4 and/or a cover has been formed in the upper and the lower edges, respectively, of the base plate 10. The back metal plate 5 comprises a profile carrier 12 designed as a hat-shaped section on the side of the base plate 10 facing away from the lateral part 11, which profile carrier 12 comprises a cushion channel 121 for attaching the cushion 4 and/or a cover. The profile carrier 12 is welded to the base plate 10 at locations which have been designated by reference numerals 14 and 15.

Figure 6:
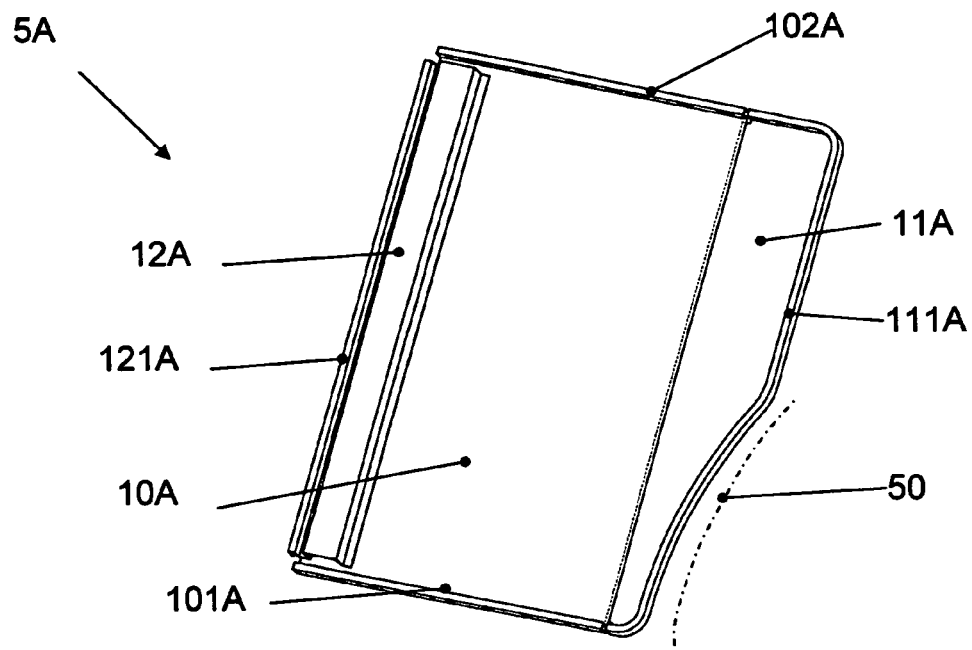
FIG. 6 shows a further example of embodiment of a back metal plate.
Figure 7:
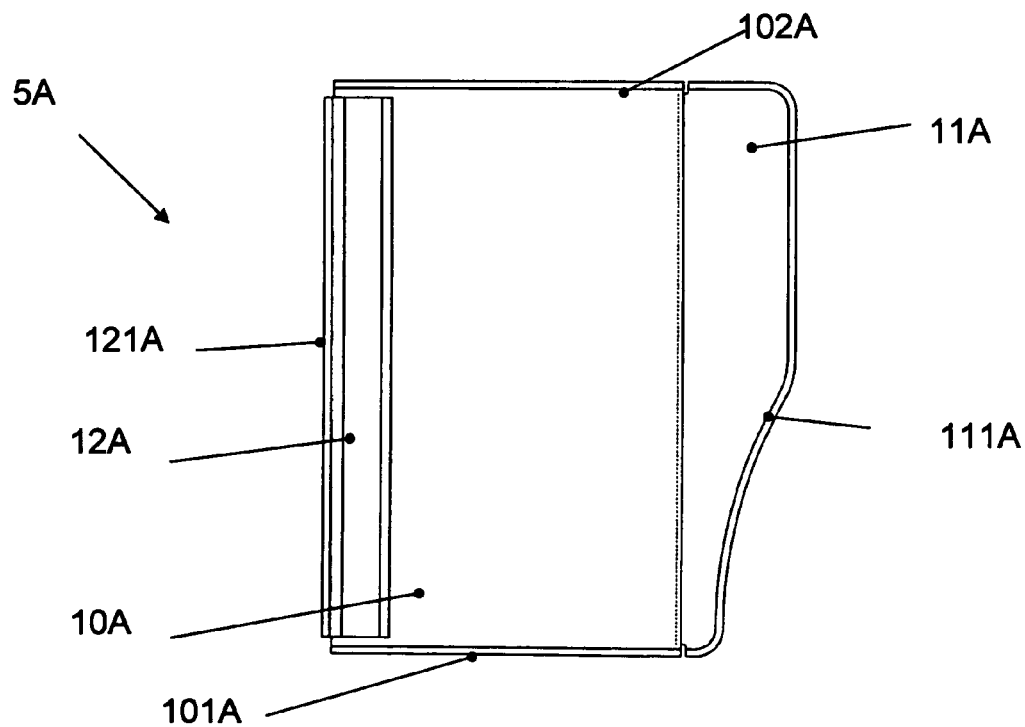
FIG. 7 shows a top view of the back metal plate according to FIG. 6.
Figure 8:
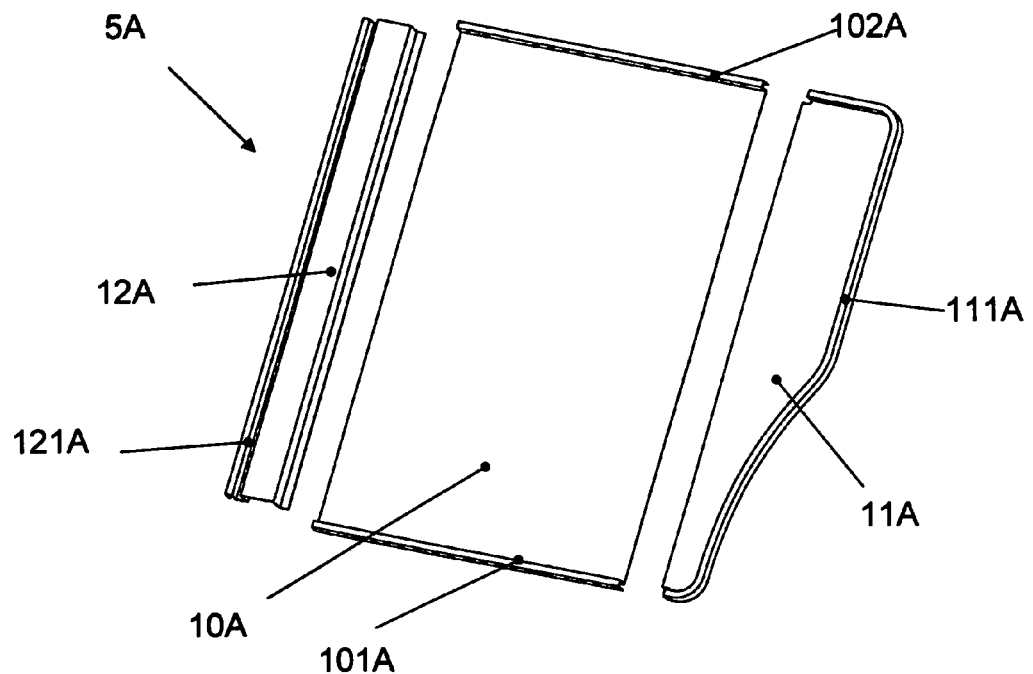
FIG. 8 shows an exploded view of the back metal plate according to FIG. 6.
Figure 9:
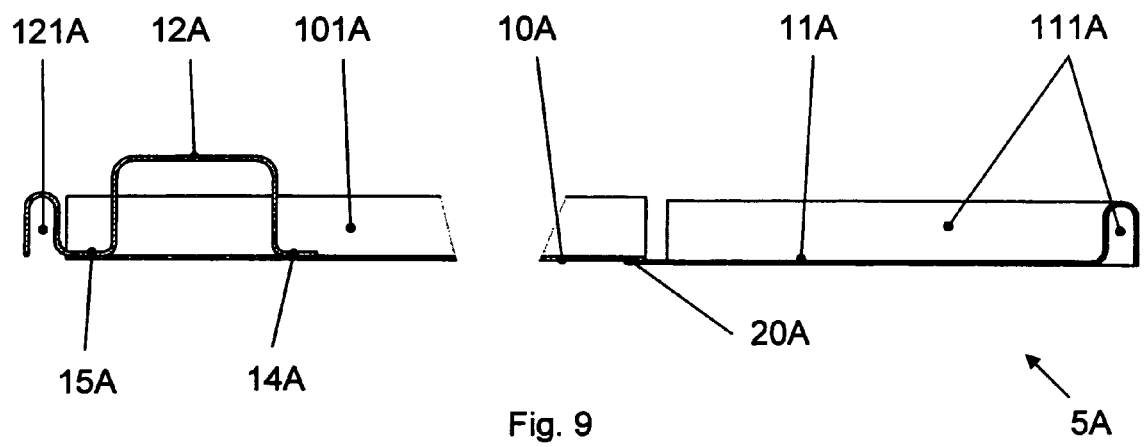
FIG. 9 shows a cross-sectional representation of the back metal plate according to FIG. 6.

FIG. 6 shows, by way of a perspective representation, an example of embodiment of a back metal plate 5A forming an alternative regarding back metal plate 5. FIG. 7 shows a top view of back metal plate 5A, FIG. 8 shows an exploded representation of back metal plate 5A, and FIG. 9 shows a cross-sectional representation of back metal plate 5A. Back metal plate 5A comprises a rolled base plate 10A corresponding to base plate 10, and a pressed lateral part 11A corresponding to lateral part 11, with the lateral part 11A overlapping with base plate 10A in an area designated by reference numeral 20A and being welded to base plate 10A in this area 20A. The side of the lateral part 11A which is facing away from the side of lateral part 11A connected to the base plate 10A is also adapted to the contour 50 of a wheel housing and/or a chassis of the motor vehicle. Herein, lateral part 11A is also according to an embodiment designed such that its width varies at least by 20% when seen in the transverse direction of the motor vehicle. The area of the base plate 10A is at least double as large as the area of the lateral part 11A. A cushion channel 111A corresponding to cushion channel 111 is formed in a portion of the edge of lateral part 11A. The base plate 10A comprises cushion channels 101A and 102A corresponding to cushion channels 101 and 102, respectively. Moreover, the back metal plate 5A comprises a profile carrier 12A corresponding to profile carrier 12 and comprising a cushion channel 121A. The profile carrier 12A is welded to the base plate 10A at locations designated by reference numerals 14A and 15A.

Figure 10:
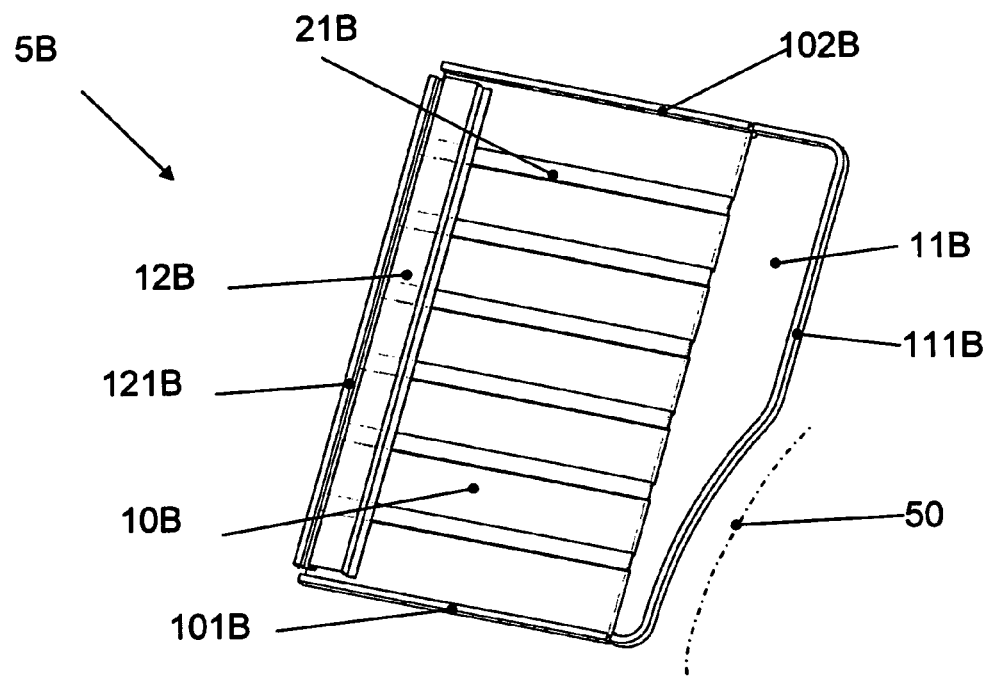
FIG. 10 shows a further example of embodiment of a back metal plate.
Figure 11:
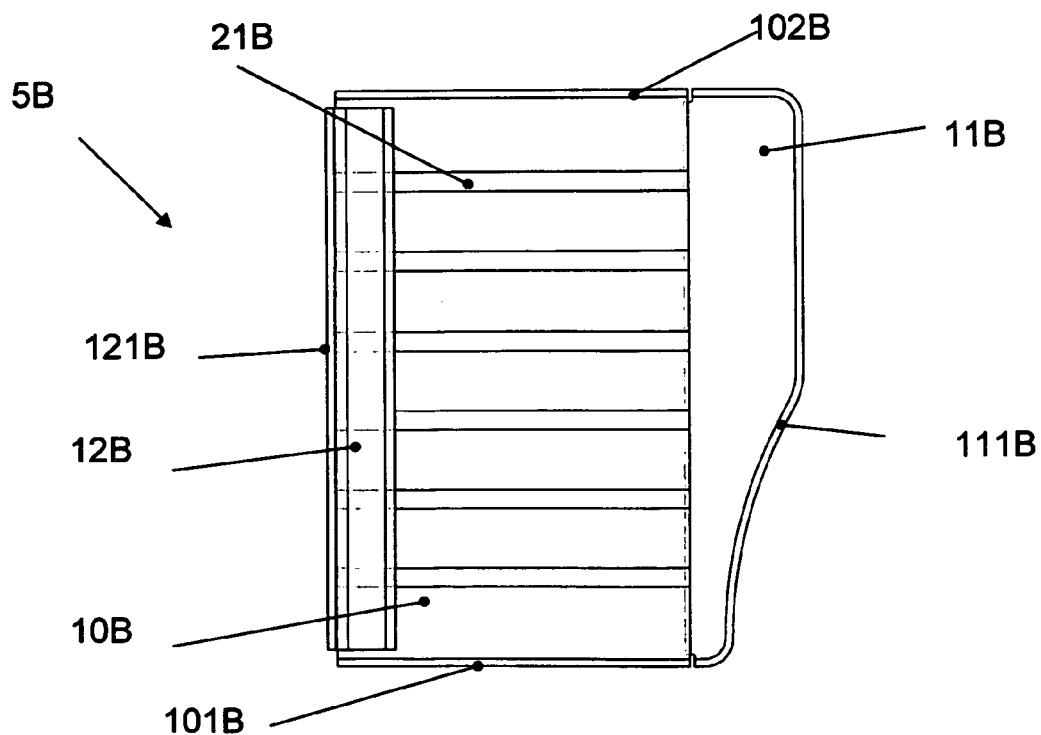
FIG. 11 shows a top view of the back metal plate according to FIG. 10.
Figure 12:
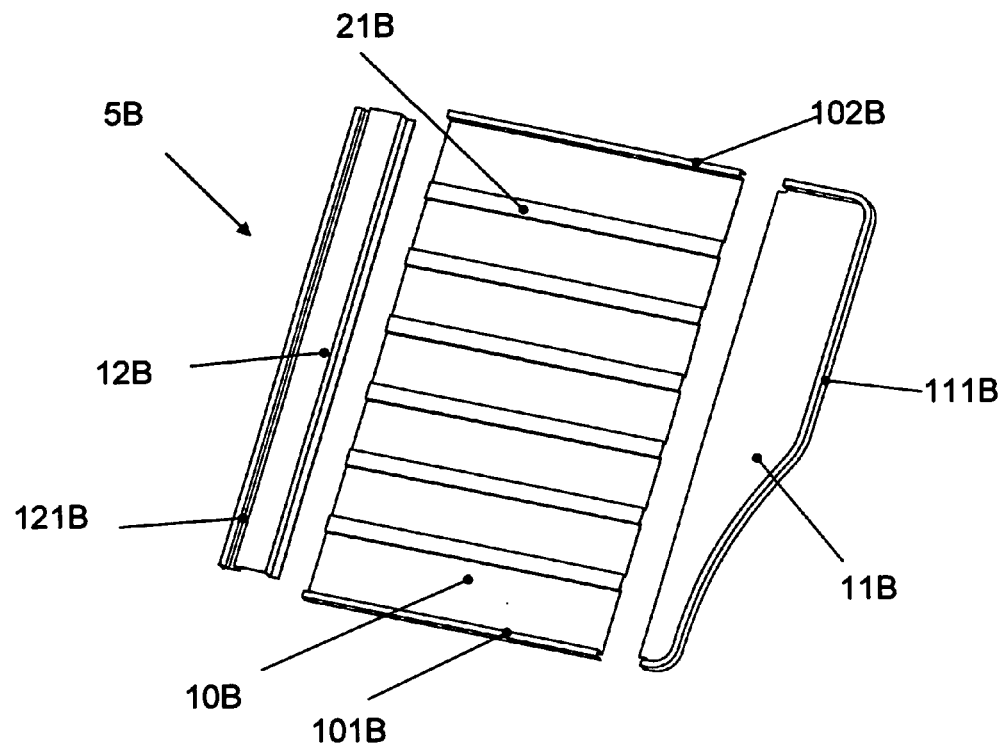
FIG. 12 shows an exploded view of the back metal plate according to FIG. 10.
Figure 13:
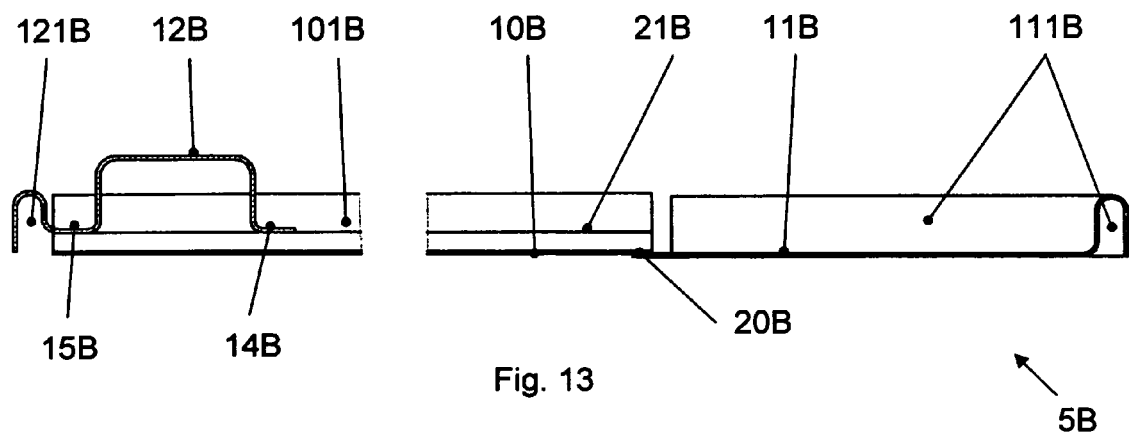
FIG. 13 shows a cross-sectional representation of the back metal plate according to FIG. 10.

FIG. 10 shows, by way of a perspective representation, an example of embodiment of a back metal plate 5B forming an alternative regarding back metal plate 5A. FIG. 11 shows a top view of back metal plate 5B, FIG. 12 shows an exploded representation of back metal plate 5B, and FIG. 13 shows a cross-sectional representation of back metal plate 5B. Back metal plate 5B comprises a rolled base plate 10B corresponding to base plate 10A, and a pressed lateral part 11B corresponding to lateral part 11A, with the lateral part 11B overlapping with base plate 10B in an area designated by reference numeral 20B and being welded to base plate 10B in this area 20B. The side of the lateral part 11B which is facing away from the side of lateral part 11B connected to the base plate 10B is also adapted to the contour 50 of a wheel housing and/or a chassis of the motor vehicle. Herein, lateral part 11B is also according to an embodiment designed such that its width varies at least by 20% when seen in the transverse direction of the motor vehicle. The area of the base plate 10B is at least double as large as the area of the lateral part 11B. Profiles or beads 21B—formed by rolling the base plate 10B—are formed in the base plate 11B and extend in the transverse direction of the motor vehicle. The base plate 10B comprises cushion channels 101B and 102B corresponding to cushion channels 101A and 102A, respectively. A cushion channel 111B corresponding to cushion channel 111A is formed in a portion of the edge of lateral part 11B. Moreover, the back metal plate 5B comprises a profile carrier 12B corresponding to profile carrier 12A and comprising a cushion channel 121B. The profile carrier 12B is welded to the base plate 10B at locations designated by reference numerals 14B and 15B.

Figure 14:
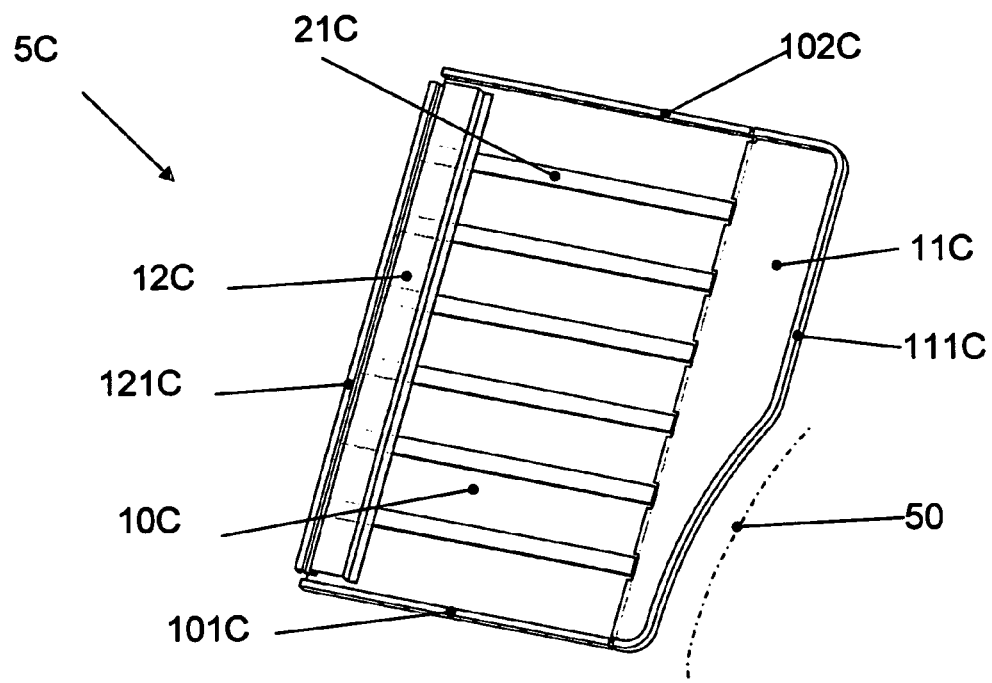
FIG. 14 shows a further example of embodiment of a back metal plate.
Figure 15:
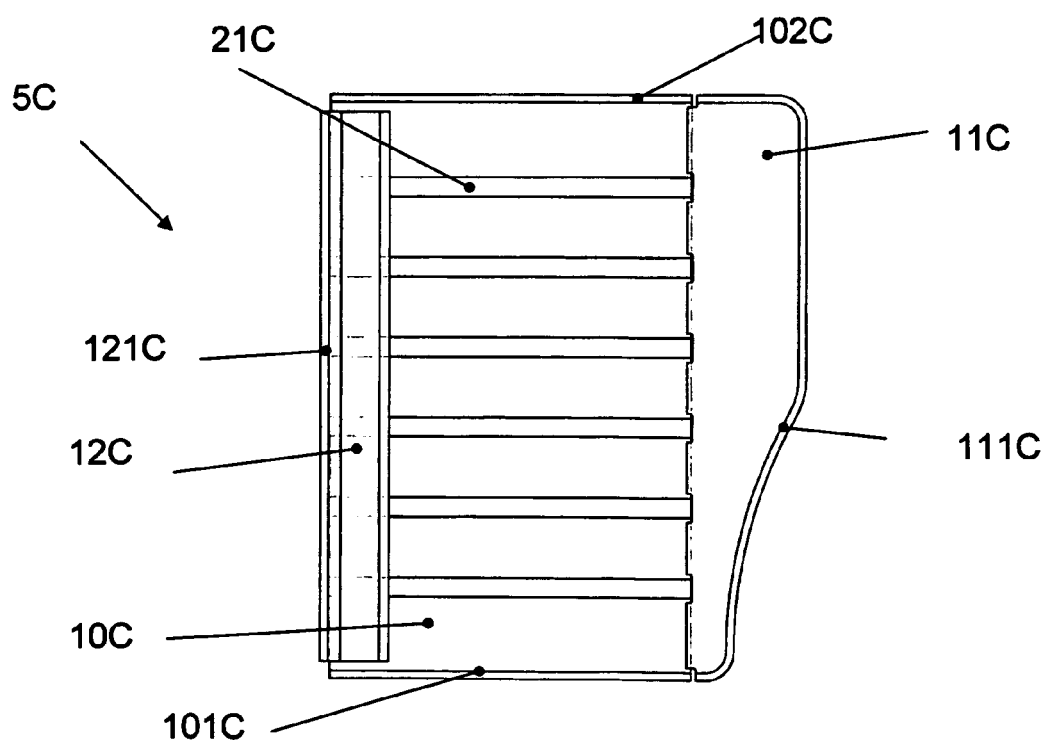
FIG. 15 shows a top view of the back metal plate according to FIG. 14.
Figure 16:
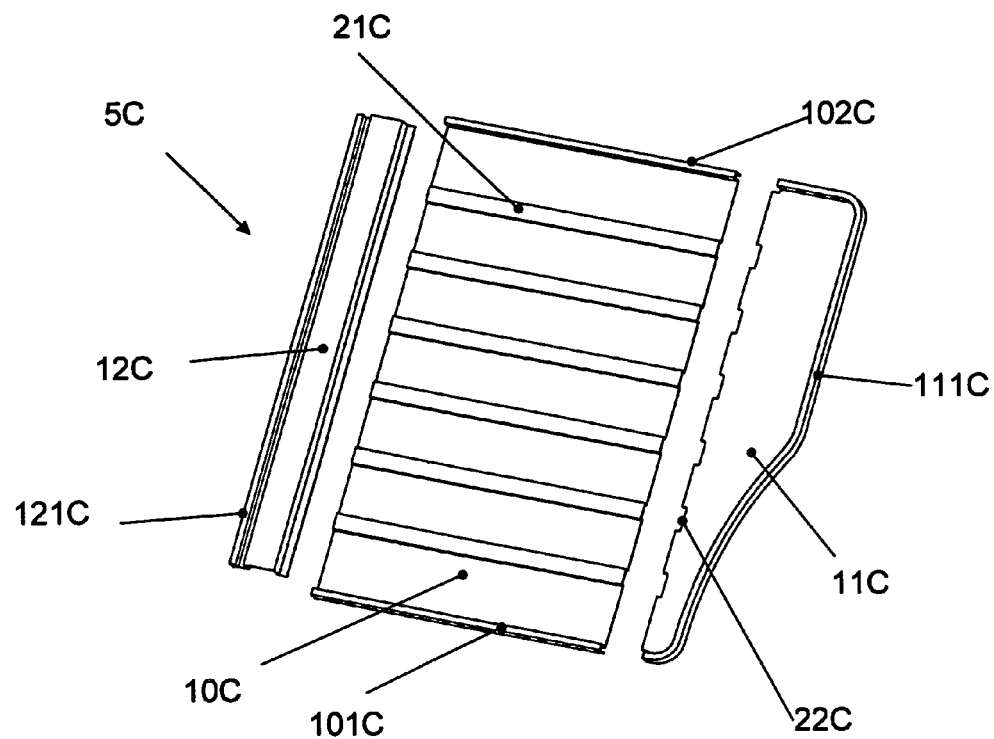
FIG. 16 shows an exploded view of the back metal plate according to FIG. 14.
Figure 17:
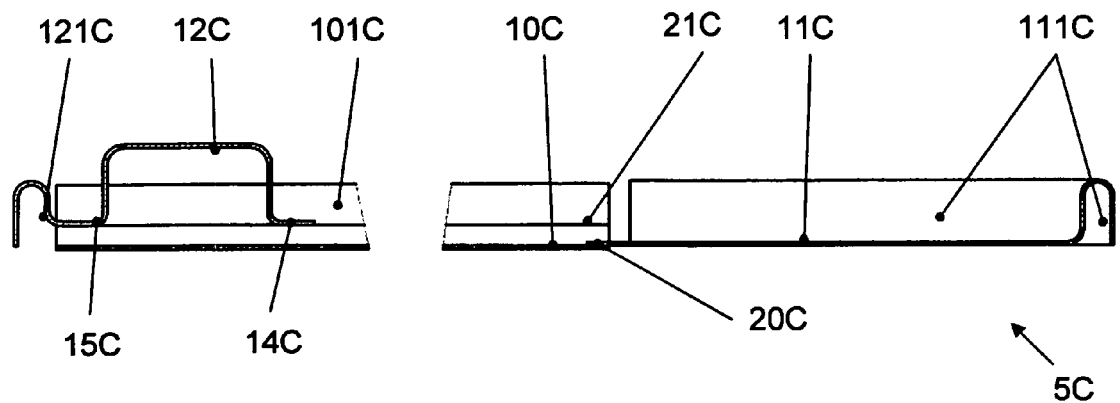
FIG. 17 shows a cross-sectional representation of the back metal plate according to FIG. 14.

FIG. 14 shows, by way of a perspective representation, an example of embodiment of a back metal plate 5C forming an alternative regarding back metal plate 5B. FIG. 15 shows a top view of back metal plate 5C, FIG. 16 shows an exploded representation of back metal plate 5C, and FIG. 17 shows a cross-sectional representation of back metal plate 5C. Back metal plate 5C comprises a rolled base plate 10C corresponding to base plate 10B, which base plate 10C has profiles or beads 21C—formed by the rolling of the base plate 10C—extending in the transverse direction of the motor vehicle, and a pressed lateral part 11C corresponding to lateral part 11B, with the lateral part 11B overlapping with base plate 10C in an area designated by reference numeral 20C and being welded to base plate 10B in this area 20C. Herein, and in contrast to the arrangement of the back metal plate 5B the lateral part 11C is arranged above the base plate 10C in area 20C. To this end, the lateral part 11C has respective recesses 22C corresponding with the profiles or beads 21C. The side of the lateral part 11C which is facing away from the side of lateral part 11C connected to the base plate 10C is adapted to the contour 50 of a wheel housing and/or a chassis of the motor vehicle. Herein, lateral part 11C is also according to an embodiment designed such that its width varies at area least by 20% when seen in the transverse direction of the motor vehicle. The area of the base plate 10C is at least double as large as the area of the lateral part 11C. A cushion channel 111C corresponding to cushion channel 111B is formed in a portion of the edge of lateral part 11B. The base plate 10C comprises cushion channels 101C and 102C corresponding to cushion channels 101B and 102B. Moreover the back metal plate 5C comprises a profile carrier 12C corresponding to profile carrier 12B and comprising a cushion channel 121C. The profile carrier 12C is welded to the base plate 10C at locations designated by reference numerals 14C and 15C.

Figure 18:
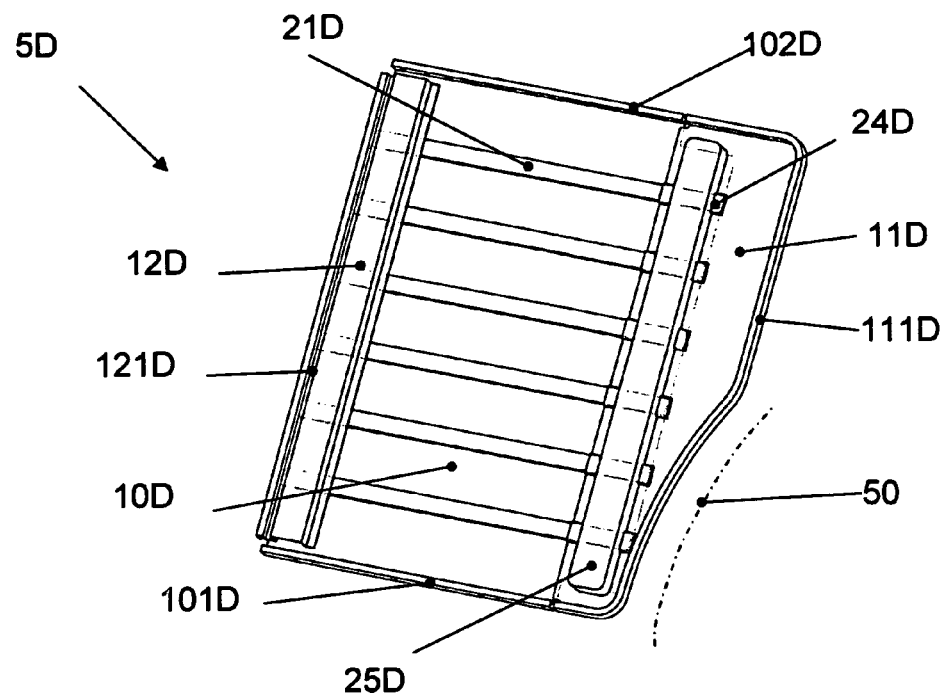
FIG. 18 shows a further example of embodiment of a back metal plate.
Figure 19:
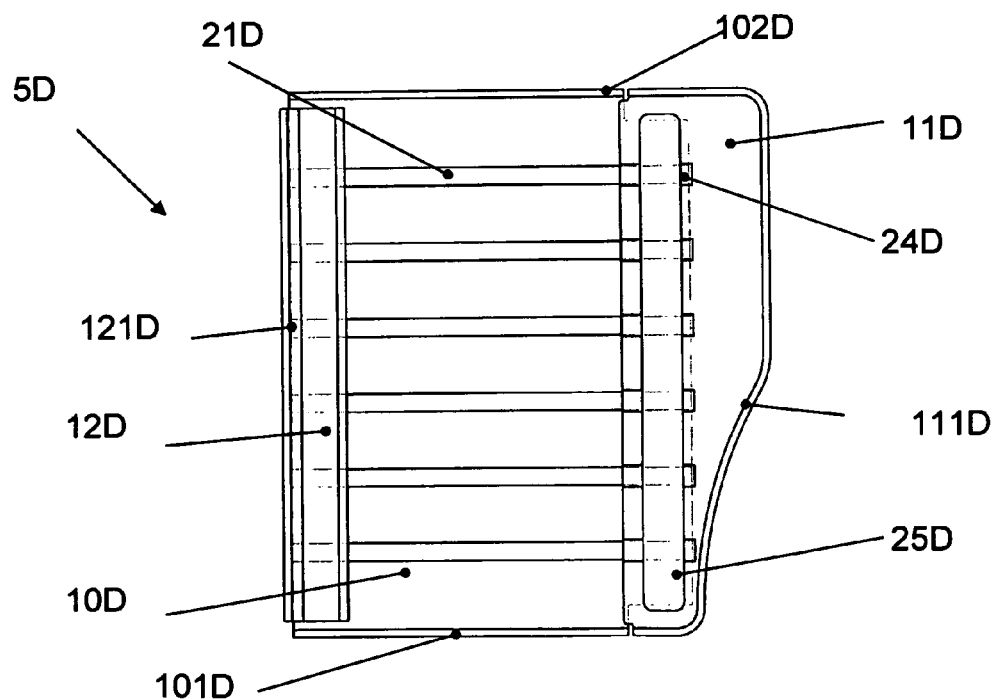
FIG. 19 shows a top view of the back metal plate according to FIG. 18.
Figure 20:
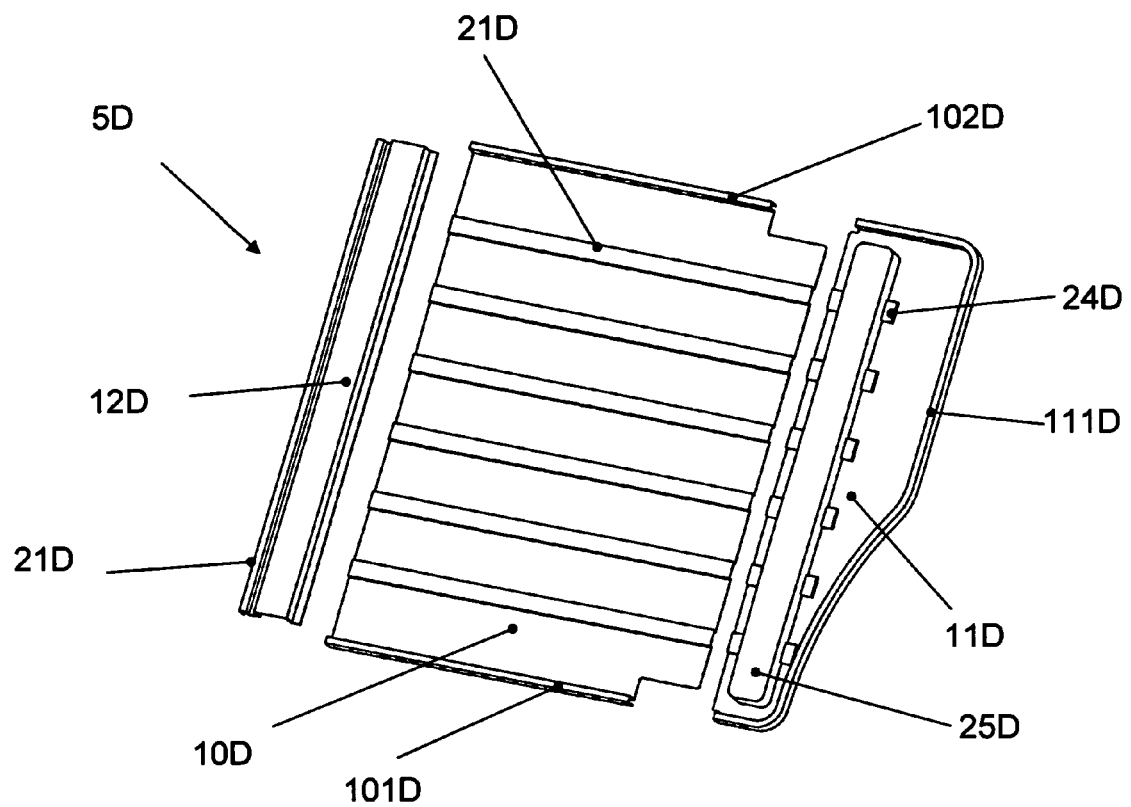
FIG. 20 shows an exploded view of the back metal plate according to FIG. 18.

FIG. 18 shows a perspective representation of a further example of embodiment of a back metal plate 5D forming an alternative regarding back metal plate 5B. FIG. 19 shows a top view of the back metal plate 5D and FIG. 20 shows an exploded view of back metal plate 5D. The back metal plate 5D comprises a rolled base plate 10D corresponding to base plate 10B and having profiles or beads 21D extending in the transverse direction of the motor vehicle, and a pressed lateral part 11D corresponding to the lateral part 11B and being welded to the base plate 10D. Profiles 24D corresponding to the profiles or beads 21D are formed in the lateral part 11D. Furthermore, a profile 25D extending orthogonally with respect to the profiles or beads 21D is formed in the lateral part 11D. In an alternative but less expedient arrangement a profile corresponding to profile 25D may be welded to the lateral part 11D as well.

The side of the lateral part 11D which is facing away from the side of lateral part 11D connected to the base plate 10D is adapted to the contour 50 of wheel housing and/or a chassis of the motor vehicle. Herein, lateral part 11D is also according to an embodiment designed such that its width varies at least by 20% when seen in the transverse direction of the motor vehicle. The area of the base plate 10D is at least double as large as the area of the lateral part 11D. A cushion channel 111D corresponding to cushion channel 111B is formed in a portion of the edge of lateral part 11D. The base plate 10D comprises cushion channels 101D and 102D corresponding to cushion channels 101B and 102B. Moreover, the back metal plate 5D comprises a profile carrier 12D corresponding to profile carrier 12B and comprising a cushion channel 121D. The profile carrier 12D is welded to the base plate 10D.

Figure 21:
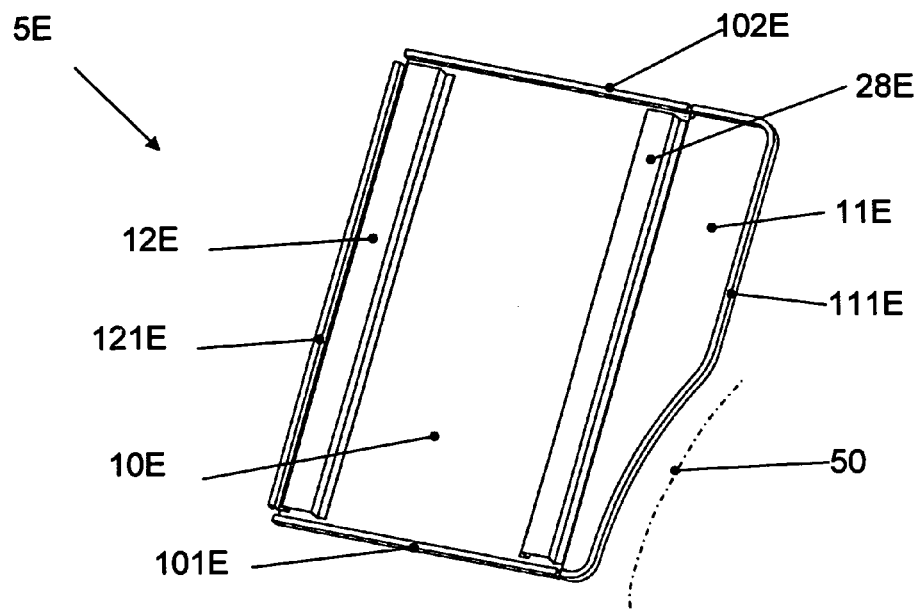
FIG. 21 shows a further example of embodiment of a back metal plate.
Figure 22:
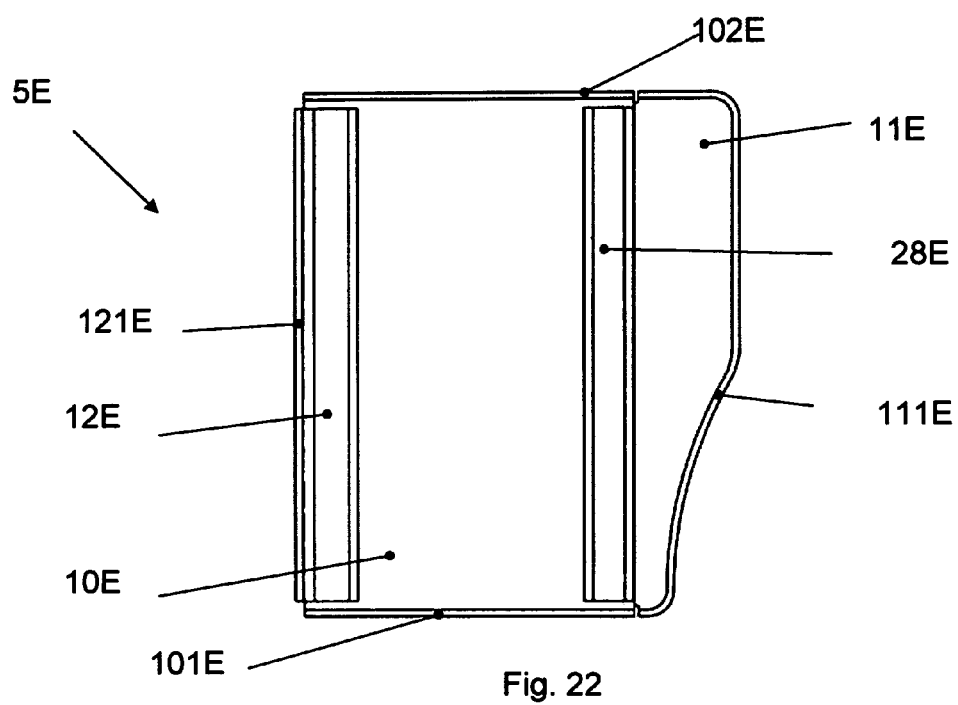
FIG. 22 shows a top view of the back metal plate according to FIG. 21.
Figure 23:
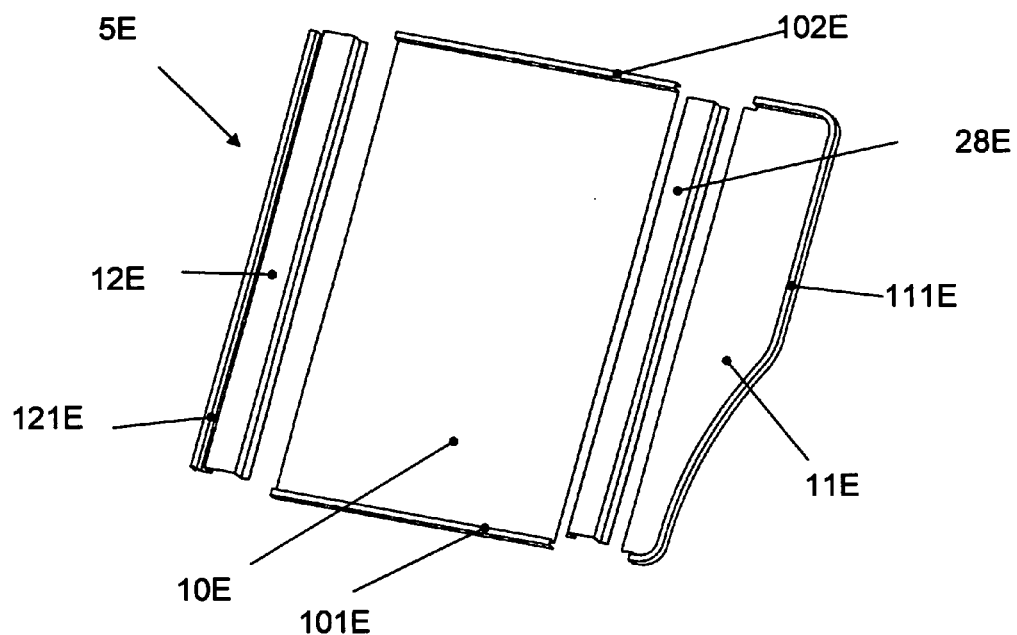
FIG. 23 shows an exploded view of the back metal plate according to FIG. 21.
Figure 24:
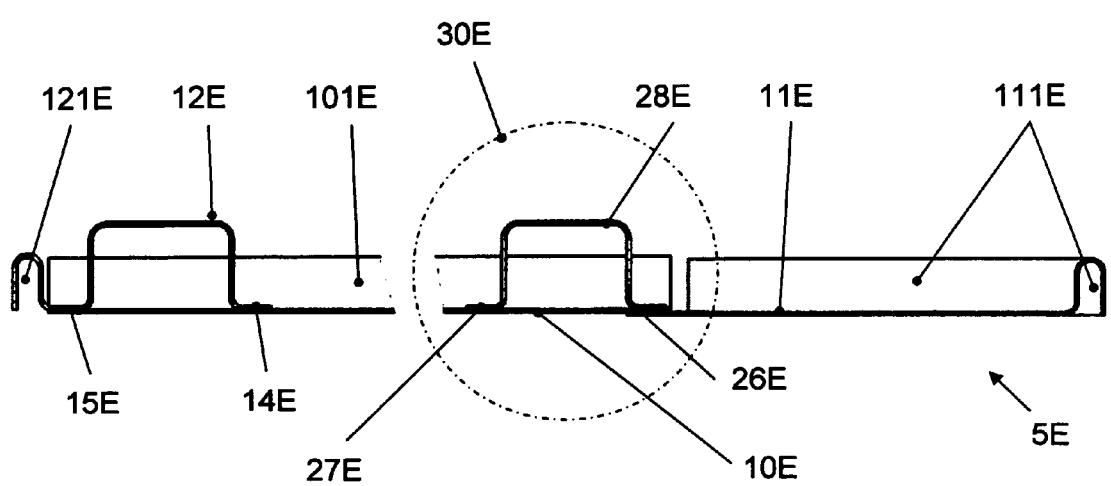
FIG. 24 shows a cross-sectional representation of the back metal plate according to FIG. 21.
Figure 25:
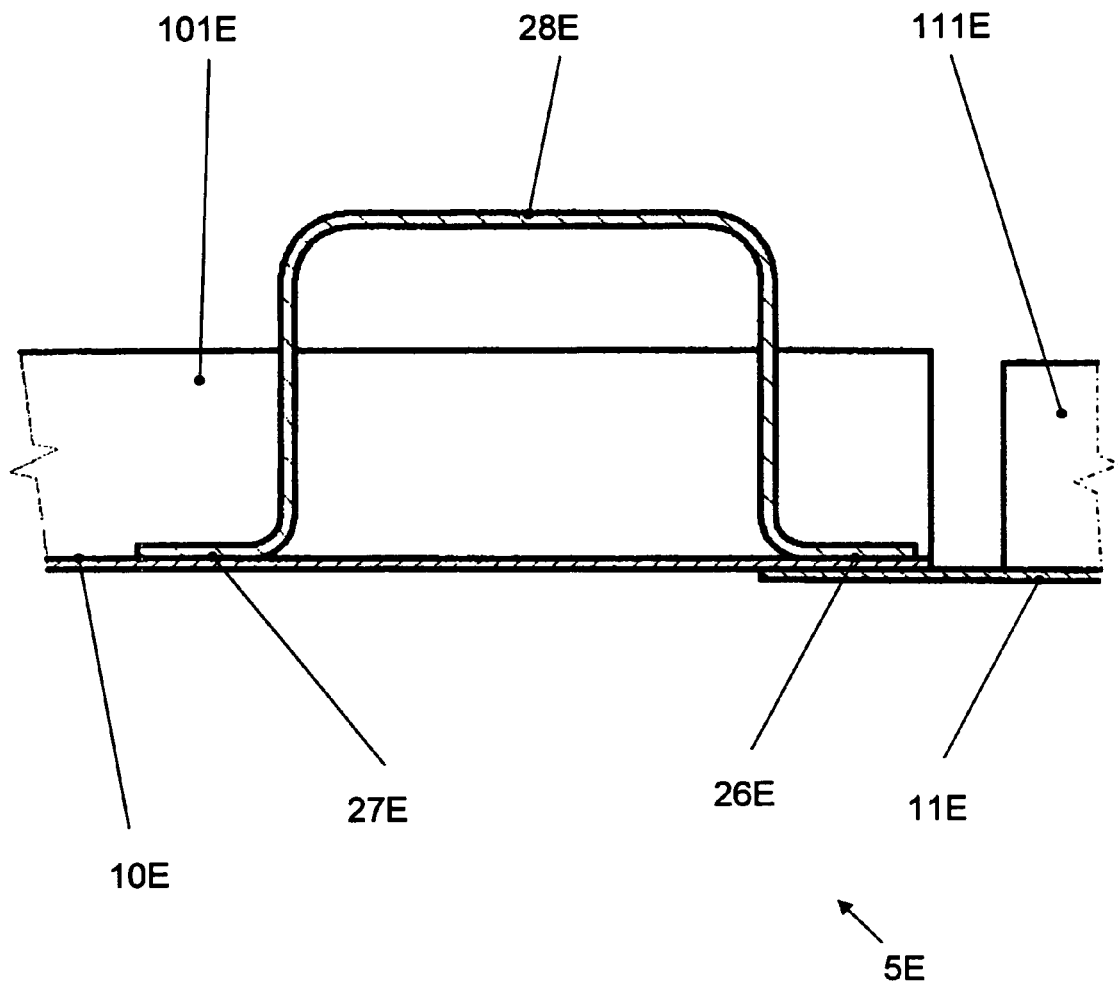
FIG. 25 shows a cut-out from, respectively the cross-sectional representation according to FIG. 24.

FIG. 21 shows, by way of a perspective representation, an example of an embodiment of a back metal plate 5E forming an alternative regarding back metal plate 5. FIG. 22 shows a top view of back metal plate 5E, FIG. 23 shows an exploded representation of back metal plate 5E, and FIG. 24 and FIG. 25 show back metal plate 5E by way of a cross-sectional representation, wherein FIG. 25 shows a cut-out from FIG. 24 which has been marked by a circle designated by reference numeral 30E in FIG. 24. Back metal plate 5E comprises a rolled base plate 10E corresponding to base plate 10, and a pressed lateral part 11E corresponding to lateral part 11, with the lateral part 11E overlapping with base plate 10E in an area designated by reference numeral 26E and being welded to the base plate 10E in this area 26E. The side of the lateral part 11E which is facing away from the side of lateral part 11E connected to the base plate 10E is adapted to the contour 50 of a wheel housing and/or a chassis of the motor vehicle as well. Herein, the lateral part 11E is also according to an embodiment designed such that its width varies at least by 20% when seen in the transverse direction of the motor vehicle. The area of the base plate 10E is at least double as large as the area of the lateral part 11E.

The back metal plate 5E further comprises a profile carrier 12E corresponding to profile carrier 12 and designed as a hat-section, as well as a profile carrier 28E which is shaped as a hat-section as well and is welded to the base plate 10E in area 26E as well in an area designated by reference numeral 27E. The profile carrier 12E is welded to the base plate 10E at locations designated by reference numerals 14E and 15E.

A cushion channel 111E corresponding to cushion channel 111 is formed in a portion of the edge of lateral part 11E. Moreover, the base plate 10E comprises cushion channels 101E and 102E corresponding to cushion channels 101 and 102. Profile carrier 12E comprises a further cushion channel 121E corresponding to cushion channel 121.

In an embodiment the lateral parts 11, 11A, 11B, 11C, 11D, and 11E are composed of a material having less tensile strength than the material of the base plates 10, 10A, 10B, 10C, 10D and 10E. Herein, the base plates 10, 10A, 10B, 10C, 10D, and 10E are composed, according to another expedient embodiment, of steel having a tensile strength of at least 800 N/mm². According to another embodiment the thicknesses of the metal plates of the lateral parts 11, 11A, 11B, 11C, 11D, and 11E are larger than the plate thicknesses of the base plates 10, 10A, 10B, 10C, 10D, and 10E. According to another expedient embodiment the base plates 10, 10A, 10B, 10C, 10D, and 10E are designed symmetrically such that a lateral part corresponding to the lateral parts 11, 11A, 11B, 11C, 11D, and 11E may be welded to a corresponding base plate 10, 10A, 10B, 10C, 10D, and 10E either on the left or on the right hand side.

Figure 26:
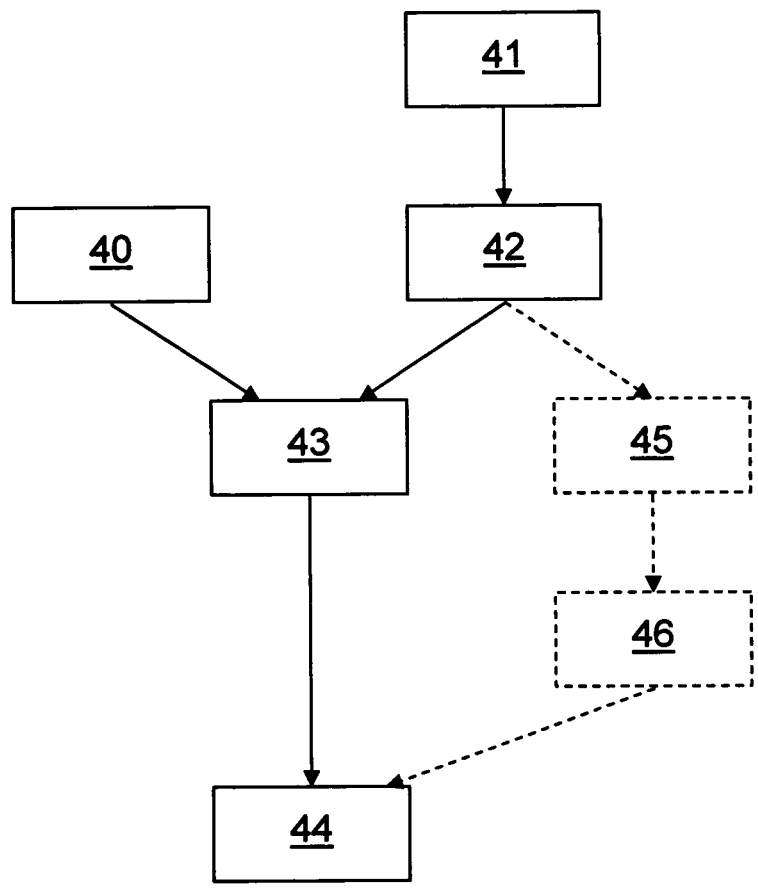
FIG. 26 shows an example of embodiment of a method for manufacturing a backrest for a rear seat or for a rear bench-type seat of a motor vehicle.
Figure 27:
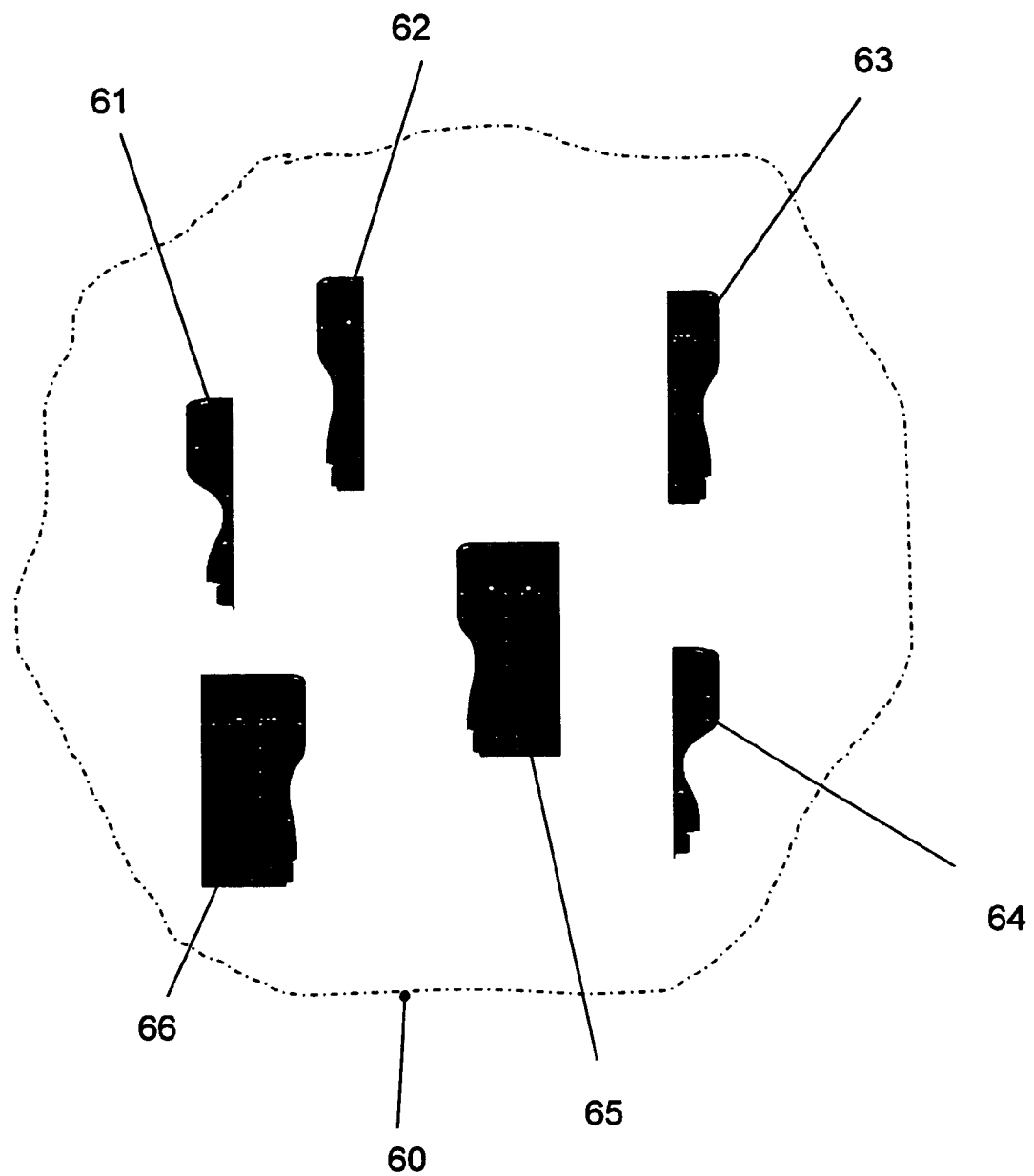
FIG. 27 shows an example of embodiment regarding a selection of lateral parts.

FIG. 26 shows an example of embodiment of a process for manufacturing a backrest for a rear seat or a rear bench-type seat of a motor vehicle such as for example one of the backrests 5, 5A, 5B, 5C, 5D, and 5E. Herein, a lateral part, which corresponds to one of the lateral parts 11, 11A, 11B, 11C, 11D, and 11E, is pressed in a step 40. Herein, lateral parts 61, 62, 63, 64, 65, 66 can be pressed as represented in FIG. 27, which parts are adapted to different contours of wheel housings. Herein, each one of the lateral parts 61, 62, 63, 64, 65, 66 may be designed corresponding to lateral parts 11, 11A, 11B, 11C, 11D, and 11E, for example.

Figure 28:
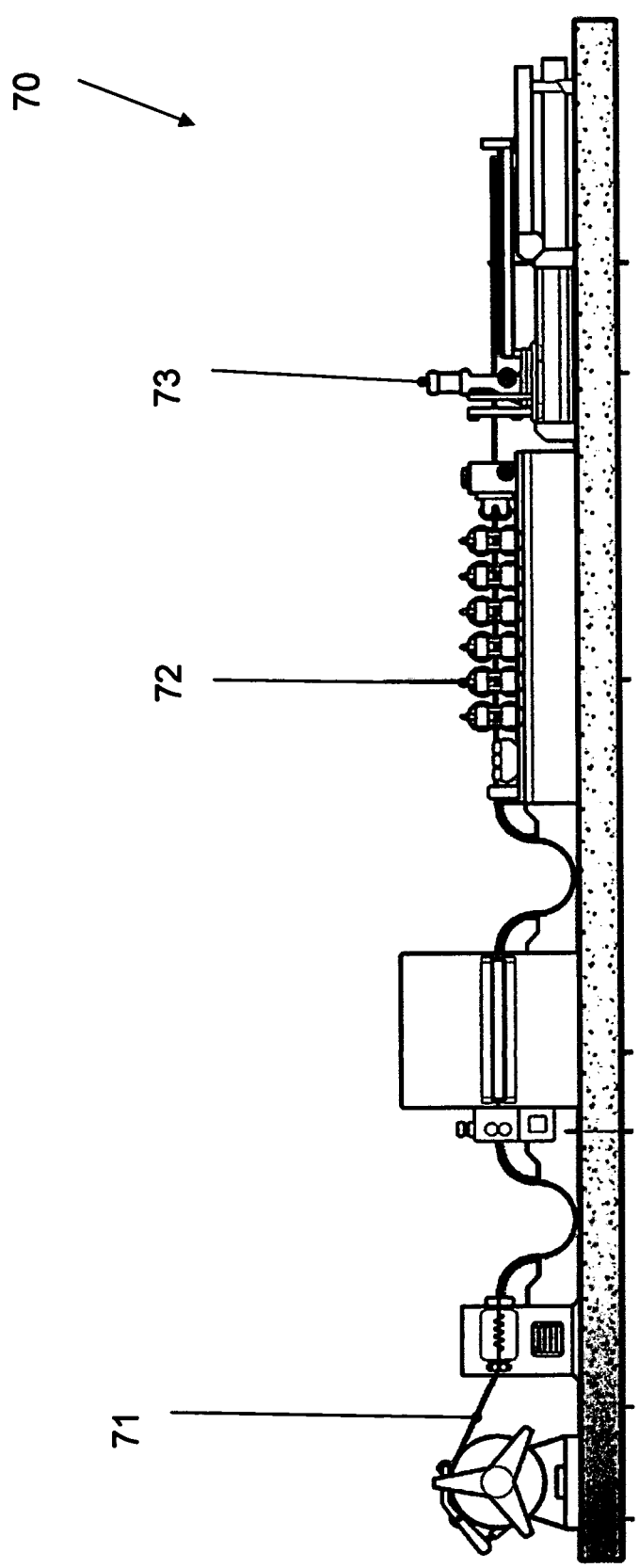
FIG. 28 shows an example of embodiment of an equipment for the rolling of base plates.
Figure 29:
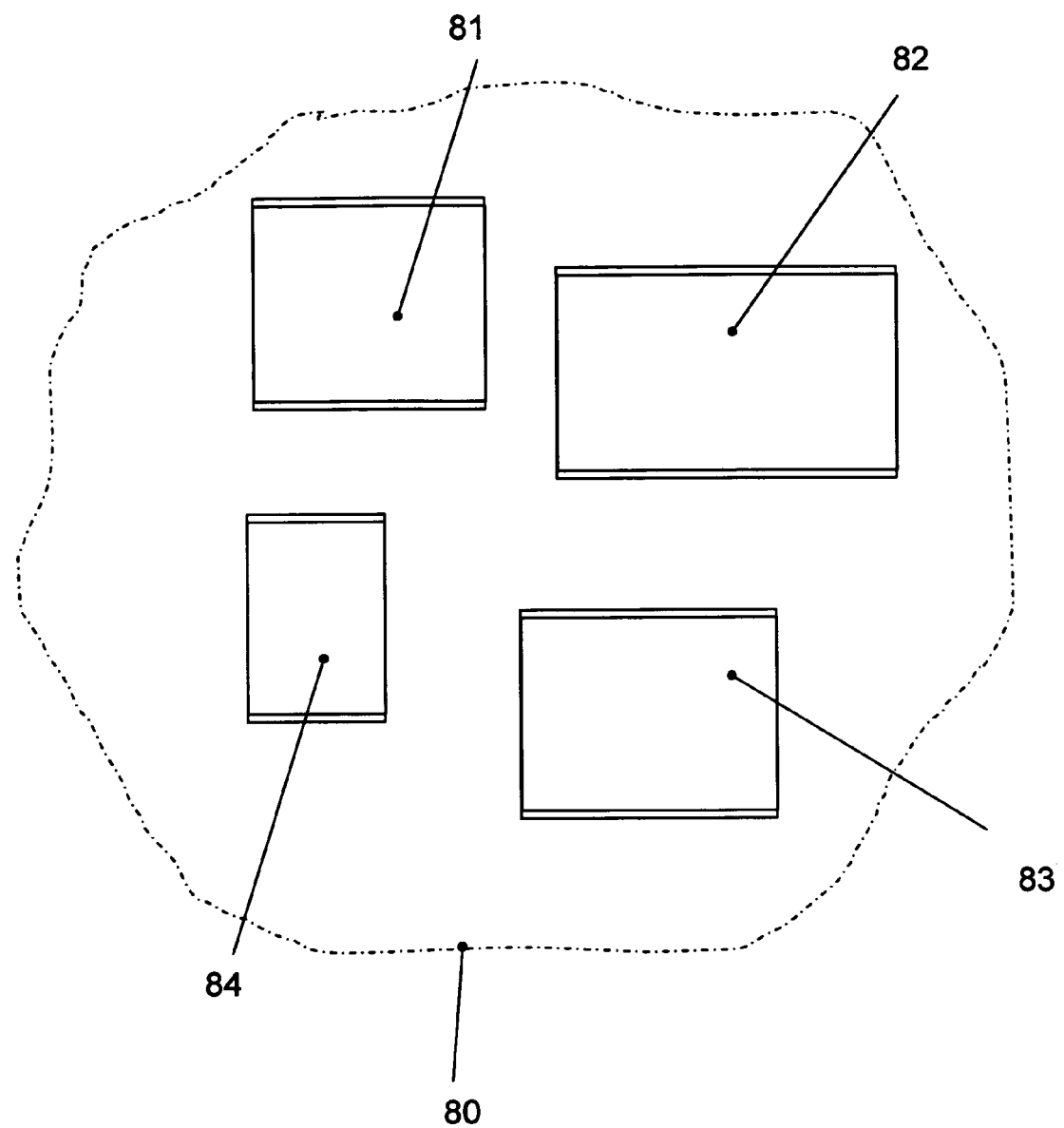
FIG. 29 shows an example of embodiment regarding a selection of base plates.

In a step 41 for manufacturing a base plate corresponding to one of the base plates 10, 10A, 10B, 100, 10D, and 10E a steel strip 71 is rolled—by means of an equipment or apparatus 70 represented by way of example in FIG. 28, or by means of rollers 72 provided in such an equipment or apparatus 70—, wherein the cushion channels 101, 102, 101A, 102A, 101B, 102B, 101C, 102C, 101D, 102D, 101E and 102E as well as the beads 21B, 21C, and 21D are formed by rolling, into the steel strip 71 and thus into the subsequent base plate 10, 10A, 10B, 10C, 10D, and 10E, respectively. Step 41 is followed by a step 42, in which—by means of a cutting device 73—the base plate 10, 10A, 10B, 100, 10D, and 10E, respectively, is cut-off from the rolled steel strip 71. Herein, base plates 81, 82, 83, 84 of differing lengths may be cut, as has been represented in FIG. 29. Herein, each of the base plates 81, 82, 83, 84 may be designed corresponding to the base plates 10, 10A, 10B, 10C, 10D, or 10E.

A step 43 follows, in the course of which one base plate 81, 82, 83, or 84, each, and one lateral part 61, 62, 63, 64, 65, or 66, each, respectively selected from a selection 60 of lateral parts 61, 62, 63, 64, 65, and 66, and from a selection 80 of base plates 81, 82, 83, 84, 85, and 86, respectively, are welded, screwed or riveted to each other to form a back metal plate 5, 5A, 5B, 5C, 5D, or 5E. Moreover, the profile carrier 12, 12A, 12B, 12C, 12D, or 12E and 28E is welded to a base plate 10, 10A, 10B, 100, 10D, and 10E and the lateral part 11E, respectively. For producing a back metal plate for a non-separated or non-separable backrest it is according to an embodiment provided that, instead of the profile carrier 12, 12A, 12B, 12C, 12D, or 12E provided with a cushion channel 121, 121A, 121B, 121C, 121D or 121E, a lateral part corresponding to lateral part 11, 11A, 11B, 11C, 11D, and 11E (however, mirror-inverted), respectively, is welded, screwed or riveted to the base plate 10, 10A, 10B, 100, 10D and 10E, respectively. If necessary, a frame is welded onto the back metal plate 5, 5A, 5B, 5C, 5D, or 5E. Step 43 is followed by a step 44 in which the back metal plate 5, 5A, 5B, 5C, 5D, and 5E is padded(-up).

Figure 30:
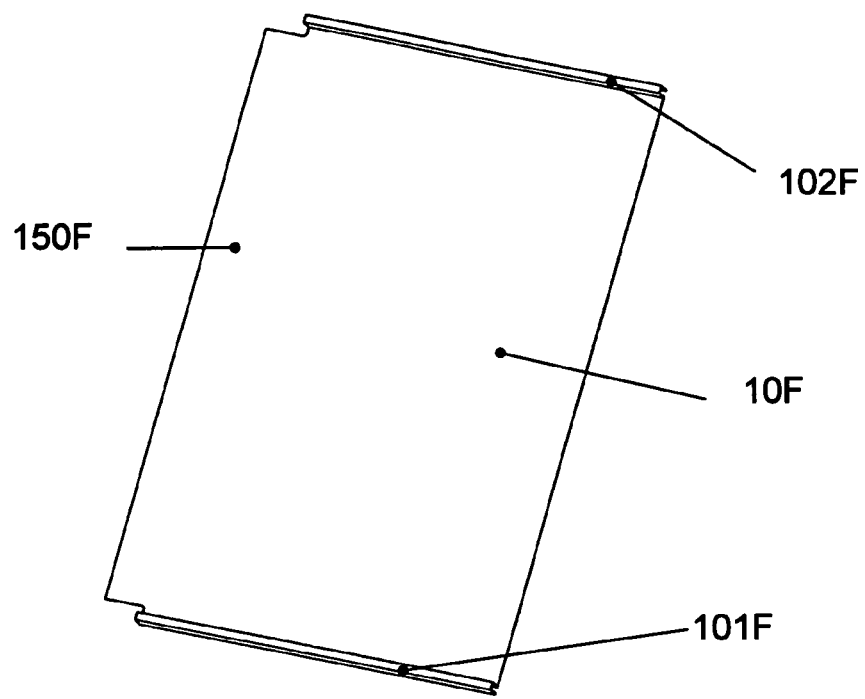
FIG. 30 shows an example of embodiment of a base plate prior to moulding an essentially vertical cushion channel.
Figure 31:
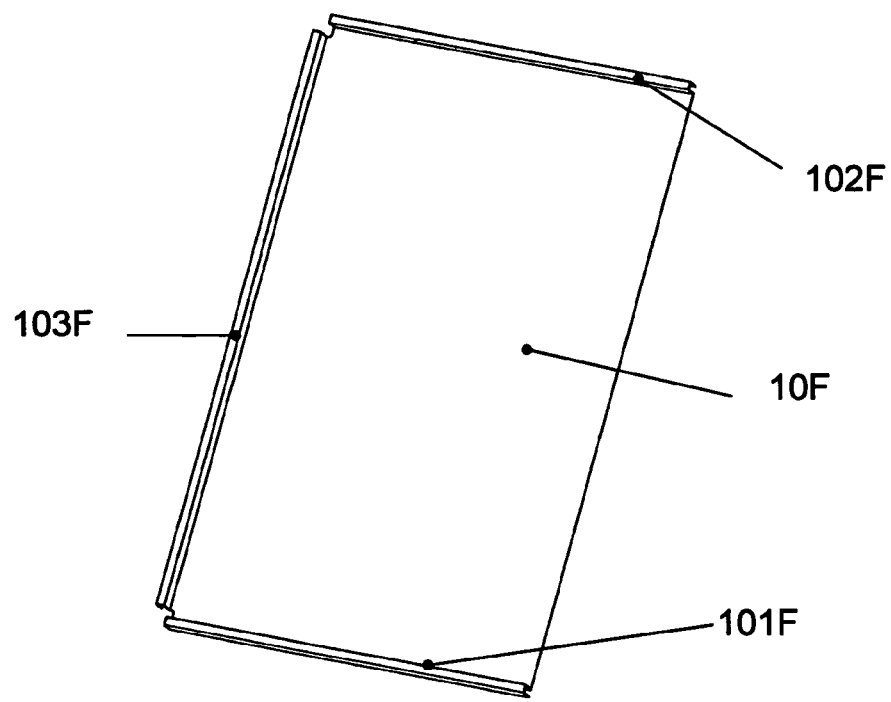
FIG. 31 shows an example of embodiment of the base plate according to FIG. 30 following the moulding of the essentially vertical cushion channel.
Figure 32:
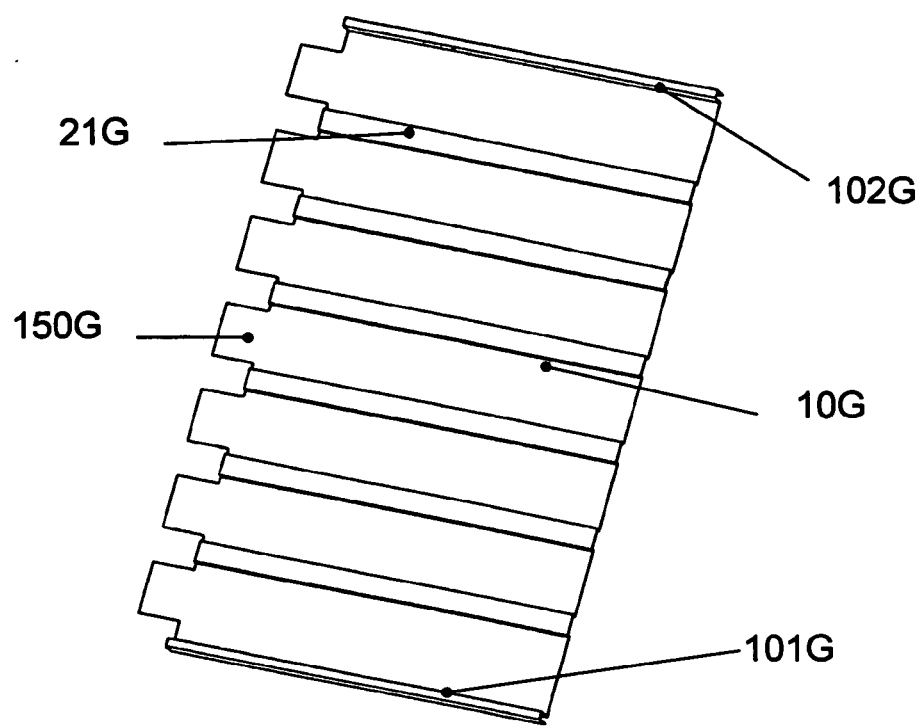
FIG. 32 shows a further example of embodiment of a base plate prior to moulding an essentially vertical cushion channel.
Figure 33:
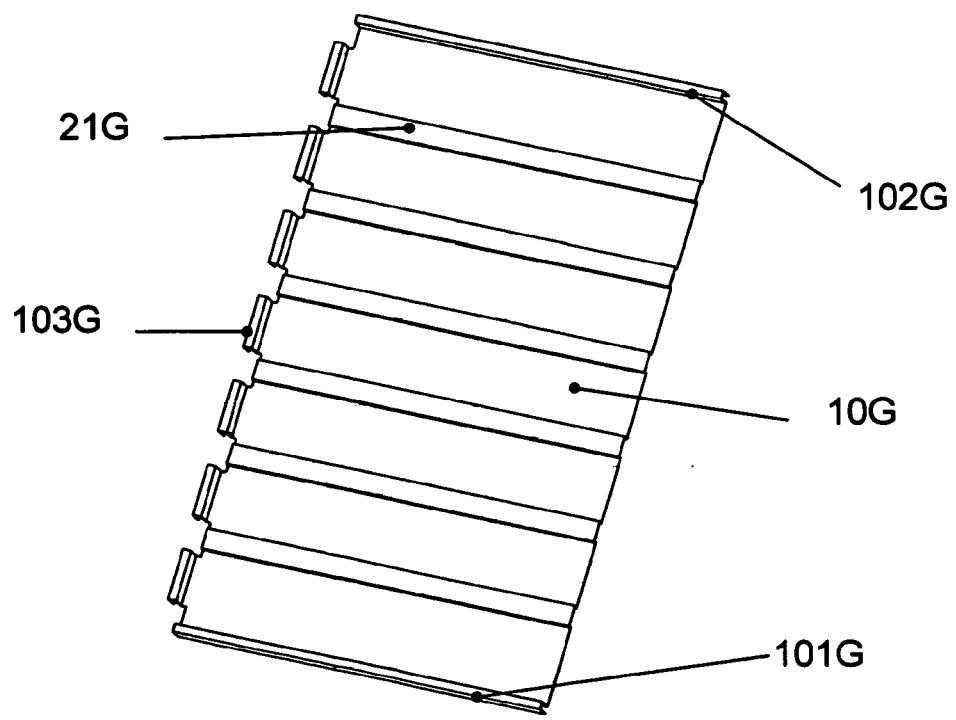
FIG. 33 shows an example of embodiment of the base plate according to FIG. 32 following the moulding of the essentially vertical cushion channel.

As an alternative of step 43 steps 40 or 42 are followed by a step 45 in which (as represented, by way of example, in FIG. 30 and FIG. 32) a flap 150F or flaps 150G is/are cut to form a base plate 10F and 10G, respectively, and a vertical cushion channel 103F and 103G, respectively, is shaped from flaps 150F or 150G, respectively (as shown, by way of example, in FIG. 31 and FIG. 33). Herein, the base plate 10F shown in FIG. 31 may replace the base plates 10, 10A or 10E, and the cushion channel 103F may replace the cushion channels 121, 121A or 121E. Cushion channels corresponding to cushion channels 101, 101A and 101E, respectively, and 102, 102A and 102E, respectively, are designated by reference numerals 101F and 102F, respectively. The base plate 100 shown in FIG. 33 may replace base plates 10B, 10C or 10D, respectively, and the cushion channel 103G may substitute cushion channels 121B, 121C or 121D, respectively. Cushion channels corresponding to cushion channels 101B, 101C, and 101D, respectively, and 102B, 102C, and 102D, respectively, are designated by reference numerals 101G and 102G, respectively, and beads corresponding to beads 21B, 21C and 21D are designated by reference numeral 21G. Step 45 is followed by step 46, in which one base plate 81, 82, 83, or 84 and one lateral part 61, 62, 63, 64, 65, or 66, each, from a selection 60 of lateral parts 61, 62, 63, 64, 65, 66 and from a selection 80 of base plates 81, 82, 83, 84, respectively, are welded, screwed or riveted to each other to form a back metal plate. Step 45 is followed by step 44, in which the back metal plate is padded.

The invention claimed is:

1. Backrest for at least one of the group of rear seat of a motor vehicle and rear bench-type seat of a motor vehicle, the backrest comprising:
    a cushion; and
    a back metal plate arranged behind the cushion and extending essentially over the whole backrest, the back metal plate comprising:
        a base plate; and
        a lateral part which, at least at one side, is fixedly connected with the base plate, wherein one side of the lateral part, which side is facing away from the side of the lateral part connected with the base plate, adapted to at least one of the group of contour of a wheel housing of the motor vehicle and contour of a chassis of the motor vehicle, and wherein the width of the lateral part varies by at least 20% when viewed in the transverse direction of the motor vehicle,
    wherein the base plate is a rolled metal plate, and
    wherein the lateral part is a pressed metal plate.

2. Backrest for at least one of the group of rear seat of a motor vehicle and rear bench-type seat of a motor vehicle, the backrest comprising:
    a cushion; and
    a back metal plate arranged behind the cushion and extending essentially over the whole backrest, the back metal plate comprising:
        a base plate and
        a lateral part that abuts and is welded to the base plate, wherein the width of the lateral part varies by at least 20% in the transverse direction of the motor vehicle,
    wherein the base plate is a rolled metal plate, and
    wherein the lateral part is a pressed metal plate.

* * * * *